US009068846B1

(12) United States Patent
Boerger

(10) Patent No.: US 9,068,846 B1
(45) Date of Patent: Jun. 30, 2015

(54) SYSTEMS, COMPUTER-IMPLEMENTED METHODS, AND COMPUTER-READABLE MEDIA TO PROVIDE BUILDING INFORMATION TO ON-SITE MOBILE-DEVICES

(75) Inventor: Marcus Boerger, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/342,616

(22) Filed: Jan. 3, 2012

(51) Int. Cl.
G01C 21/20 (2006.01)
G06Q 10/10 (2012.01)

(52) U.S. Cl.
CPC .......... *G01C 21/206* (2013.01); G06Q 10/1095 (2013.01)

(58) Field of Classification Search
CPC ...... G01C 21/00; G01C 21/206; G01C 21/36; G01C 21/3638; G06Q 10/1095
USPC ............... 701/410; 705/5, 323, 346; 340/5.7, 340/5.28; 455/456.1, 456.3
See application file for complete search history.

(56) References Cited

U.S. PATENT DOCUMENTS

| 6,728,636 | B2 | 4/2004 | Kokojima et al. |
| 7,733,213 | B2* | 6/2010 | Levine .................... 340/5.28 |
| 2002/0116233 | A1* | 8/2002 | Kuge ........................ 705/5 |
| 2006/0247849 | A1 | 11/2006 | Mohsini et al. |
| 2007/0001904 | A1 | 1/2007 | Mendelson |
| 2007/0069923 | A1 | 3/2007 | Mendelson |
| 2010/0121567 | A1 | 5/2010 | Mendelson |
| 2010/0328025 | A1* | 12/2010 | Razdan ..................... 340/5.7 |
| 2010/0331014 | A1* | 12/2010 | Sanches et al. .......... 455/456.3 |
| 2011/0081918 | A1* | 4/2011 | Burdo et al. ............. 455/456.1 |
| 2011/0119485 | A1* | 5/2011 | Killian et al. ............ 713/156 |
| 2011/0137549 | A1 | 6/2011 | Gupta et al. |
| 2011/0154335 | A1 | 6/2011 | Tuovinen |
| 2011/0184646 | A1 | 7/2011 | Wong et al. |
| 2012/0164990 | A1* | 6/2012 | Amora et al. ............ 455/414.1 |
| 2012/0310852 | A1* | 12/2012 | Ramalingamoorthy et al. ......................... 705/323 |

FOREIGN PATENT DOCUMENTS

| EP | 2177928 A1 | 4/2010 |
| JP | 2001311628 | 11/2001 |

OTHER PUBLICATIONS

Donald J. Patterson, "Constructing Topological Maps of Displays with 3-D Positioning Information", 2009.

* cited by examiner

*Primary Examiner* — Fadey Jabr
*Assistant Examiner* — Aaron L Troost
(74) *Attorney, Agent, or Firm* — Dority & Manning, P.A.

(57) ABSTRACT

Systems, methods, computer-readable media, and user interfaces are provided. In some aspects, the provided techniques transmit to a mobile device a notification of one or more buildings, service providers; or services relating to a geographic position of, or an environment of, the mobile device. Information relating to services provided in a building may be displayed to a user, and the user's selection may be received by the mobile device. The user may be guided to one or more service providers for the user-selected service. Further Information relating to services, service providers, and buildings may be presented to the user as relates to the user-selected service. Systems, methods, and computer-readable media are further provided that, in some instances, notify a service provider of a user's selection received by the mobile device and in some instances, notify a service provider of a geographic position for the mobile device.

20 Claims, 23 Drawing Sheets

SYSTEMS, COMPUTER-IMPLEMENTED METHODS, AND COMPUTER-READABLE MEDIA TO PROVIDE BUILDING INFORMATION TO ON-SITE MOBILE-DEVICES

BACKGROUND OF THE INVENTION

1. Field of the Invention

The disclosed embodiments relate generally to the identification and delivery of content for mobile devices, and more particularly to the identification and delivery of building information relating to the geographic location of a mobile device.

2. Background of the Invention

Some mobile devices (e.g., smartphones, tablet computers) allow users to access feature-rich services typically reserved for full-sized computing devices, such as laptops and desktop computers. Indeed, some mobile devices allow users of mobile devices ("mobile-device users") to access websites, execute various local applications (e.g., apps), access calendar applications and appointment data, access navigation or (e.g., and/or) mapping services, access publicly available information for example, through the world-wide-web.

Certain navigation services or map services are useful on mobile devices for searching for locating, mapping geographic locations (e.g., points of interest, geographical areas, or regions), obtaining navigation directions (such as for driving, walking, or mass-transit directions) to geographic locations, and obtaining information concerning points of interest (e.g., name, address, telephone number, etc.). Some mobile devices are capable of providing turn-by-turn directions that the user may use while traveling to their destination. These navigation services or map services are similar to those provided for desktop computers; however, implementation on mobile devices can allow operation of such services as may be relevant to the current geographic location of the mobile device.

SUMMARY OF THE INVENTION

Systems, methods, computer programs, and user interfaces are provided. In some aspects, the provided techniques transmit to a mobile device a notification of one or more buildings, service providers, or services relating to a geographic position of, or an environment of, the mobile device. Information relating to services provided in a building may be displayed to a user, and the user's selection may be received by the mobile device. The user may be guided to one or more service providers for the user-selected service. Further information relating to services, service providers, and buildings (collectively, "building information") may be presented to the user as it relates to the user-selected service. Systems, methods, and computer programs are further provided that, in some instances, notify a service provider of a user's selection received by the mobile device and in some instances, notify a service provider responsive to the positional location for the mobile device (e.g., that a user selecting a user-selected service has arrived at the building or at the service-provider's location).

In some embodiments, systems, computer-implemented methods, and non-transitory computer-readable media may detect an initiation of communication from an on-site mobile device in or adjacent to a building. In some embodiments, systems, computer-implemented methods, and non-transitory computer-readable media may request appointment data from the on-site mobile device responsive to a building identifier for the building. The on-site mobile device may respond by transmitting appointment data including an appointment identifier. In some embodiments, systems, computer-implemented methods, and non-transitory computer-readable media may match the appointment identifier to a service identifier for a scheduled service. The service data associated with the matching service identifier can be validated scheduled-service data. In some embodiments, systems, computer-implemented methods, and non-transitory computer-readable media may generate service-specific service-provider notification information responsive to at least one of the validated appointment data and the validated scheduled-service data. In some embodiments, systems, computer-implemented methods, and non-transitory computer-readable media may transmit the service-specific service-provider notification information to one or more service-provider devices responsive to a service-provider identifier associated with the validated scheduled-service data. In some embodiments, systems, computer-implemented methods, and non-transitory computer-readable media may generate service-specific navigation information responsive to the building data and the service-provider identifier for the validated scheduled-service data. In some embodiments, systems, computer-implemented methods, and non-transitory computer-readable media may transmit the service-specific navigation information to the on-site mobile device so that the on-site mobile device, when transported in the building, displays a navigation interface responsive to the service-specific navigation information.

In some embodiments, systems, computer-implemented methods, and non-transitory computer-readable media may detect an initiation of communication from the on-site mobile device with one or more on-site transceivers and request appointment data from the on-site mobile device responsive to the building identifier, the on-site mobile device being adapted to respond by transmitting appointment data including an appointment identifier. In some embodiments, systems, computer-implemented methods, and non-transitory computer-readable media may detect a position of the mobile device responsive to receiving data indicative of a user-desired service from the mobile device in communication with one or more on-site transceivers, and determine a direct route from the position of the mobile device to the service-provider location responsive to the building data and the position of the mobile device. In some embodiments, systems, computer-implemented methods, and non-transitory computer-readable media may detect an initiation of communication with one or more on-site transceivers received from the on-site mobile device; and transmit to the on-site mobile device building inventory information comprising any of the building data and the service data.

In some embodiments, systems, computer-implemented methods, and non-transitory computer-readable media may display an appointment selection interface on a display of a mobile device responsive to a positional location of the mobile device being at or adjacent to a positional location of a building. The appointment selection interface can include one or more predefined appointments for scheduled services to be provided at the building. In some embodiments, systems, computer-implemented methods, and non-transitory computer-readable media may display an appointment navigation interface on the display of the mobile device responsive to receiving a user-selected appointment at the appointment selection interface. The appointment navigation interface can include floor plan data (e.g., from the building data) for the building indicative of a route between the positional location of the mobile device and the positional location of a service provider for the user-selected appointment. Floor plan data can include, for example, image data (floor plan images, floor plan image layers) as well as other data (labels, vector coordinates for rendering vector images, etc.) relating to a floor plan. In some embodiments, systems, computer-implemented methods, and non-transitory computer-readable media may initiate the transmission of an arrival notification to a computing device associated with the service provider for the user-selected appointment responsive to receiving the user-selected appointment at the appointment selection interface. In some embodiments, initiating the transmission of an arrival notification to a computing device associated with the service provider for the user-selected appointment includes transmitting an arrival notification to a building server device configured to receive the arrival notification and to transmit the arrival notification to the computing device associated with the service provider.

BRIEF DESCRIPTION OF THE DRAWINGS

So that the manner in which the features and benefits of the invention, as well as others which will become apparent, may be understood in more detail, a more particular description of the embodiments may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

Figure 1:
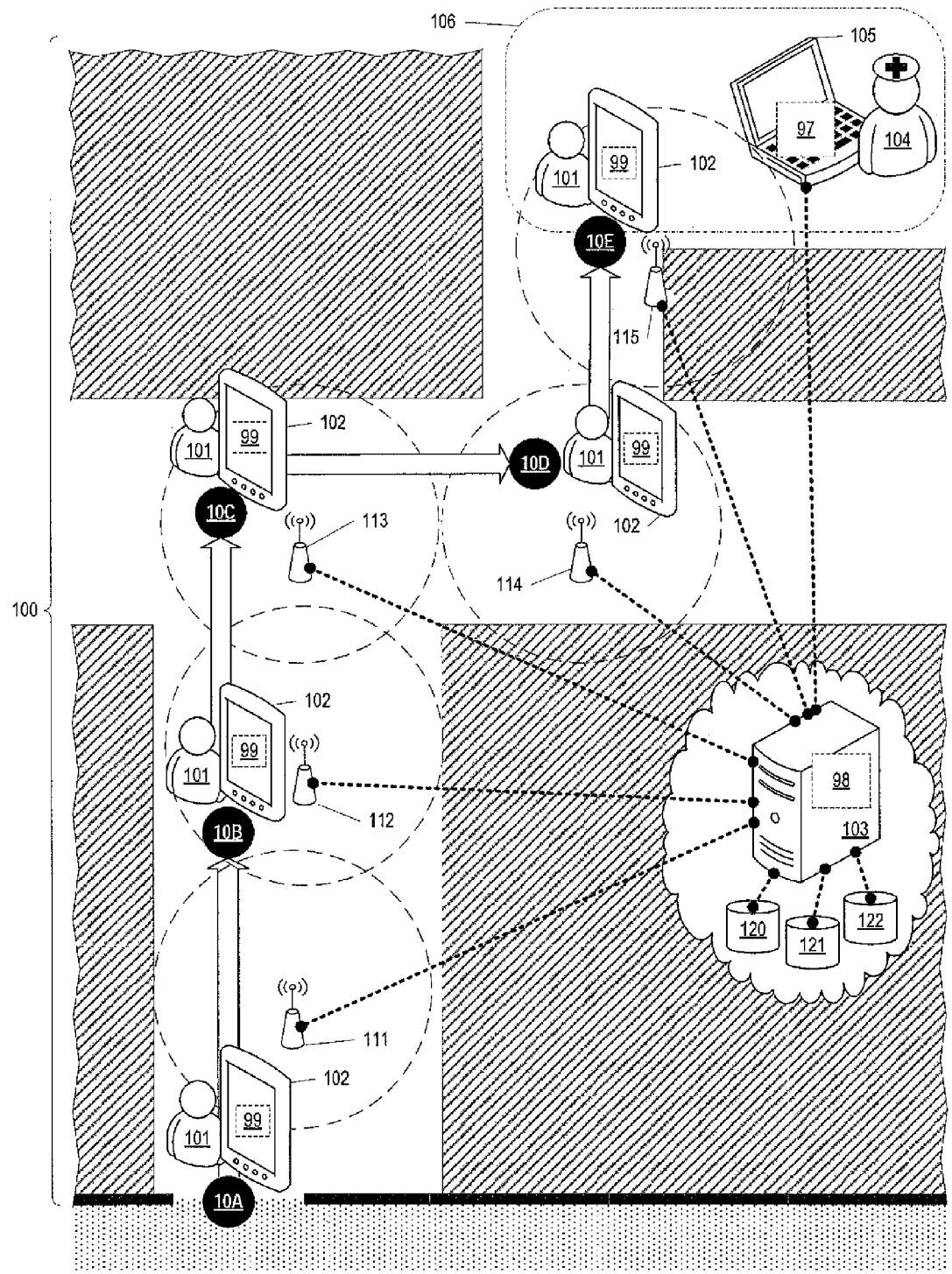
FIG. 1 includes a schematic plan or map view illustrating a mobile device user traversing a building according to various embodiments described herein.

Although the invention is susceptible to various modifications and alternative forms, specific embodiments thereof are shown by way of example in the drawings and will herein be described in detail. In the drawings and description that follow, like parts are marked throughout the specification and drawings with the same reference numerals, respectively. Prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

The present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings.

Certain embodiments described below may provide, to mobile-device users, information relating to a building (including information relating to service providers operating in a building) based on a geographic location of the mobile-device user. For instance, building information such as building floor plans, directories of service providers in the buildings, and other information as described in more detail below, can be displayed at a mobile-device interface, by which the user may view the information or make selections from the information. Further, certain embodiments described below may provide, to mobile-device user, information relating to a building (including information relating to service providers operating in a building and information relating to services to be provided in a building) based on data indicative of a service desired by the mobile-device user. For instance, information such as in-building navigation information, information indicative of services provided in the building, and other information as described in more detail below, can be displayed at a mobile-device interface, by which the user may view the information or make selections from the information.

Even further, certain embodiments described below may provide, to service providers operating in a building, information relating to a mobile-device user, for example, based on a positional location of the mobile-device user or, for example, based on data indicative of a service desired by the mobile-device user. For instance, information relating to the geographic location of the mobile-device user, information relating to services desired by the mobile-device user, and other information as described in further detail below, can be displayed at a service-provider device interface, by which a service-provider user may view the information or make selections from the information.

FIG. 1 depicts that a mobile device can be used and transported by a mobile-device user (101) as the mobile-device user approaches, enters, or travels within or adjacent to a building (100) while transporting a mobile device (102). In various embodiments, the mobile device (102) may receive information relating to the building (100), e.g., information relating to one or more services provided in the building (100), when the device-user (101), transporting the mobile device (102) approaches, enters, or is in the building (100). Further, in various embodiments, for example, the mobile device user (101) can make selections at the mobile device (102) when the device-user (101), transporting the mobile device (102) approaches, enters, or travels within the building (100). FIG. 1 also depicts that a service-provider device (105) can be used by a service provider (104) with respect to services provided in the building (100). In various embodiments, for example, the service-provider device (105) may receive information relating to the mobile device (102) or the mobile-device user (101) when the mobile-device user (101), transporting the mobile device (102), approaches, enters, or is in the building (103). Further, in various embodiments, for example, the mobile device user (101) can make selections at the mobile device (102) when the device-user (101), transporting the mobile device (102) approaches, enters, or is in the building (100).

FIG. 1 further depicts that the mobile device (102) and a building-server device (103) can communicate, for example, using wireless communication signals transmitted and received at the mobile device (102) and one or more wireless base stations (111,112,113,114,115) positioned within or adjacent to the building (100) and communicatively coupled to the building-server device (103). As is described below, the mobile device (102) may be in communication with the building-server device (103) through other means (alternatively or in addition), including, for example, a telecommunications network and the Internet. Although the building-server device (103) is depicted as being positioned within the building (100), the absolute or relative position of the building-server device (103) may not be significant in various embodiments. In some embodiments, for example, the building server device (103) may be positioned in remote server facility (not pictured) or may include a plurality of server devices (not pictured), several of which may be positioned within the building (100) and several of which may be positioned external to the building (100) (e.g., at a remote server facility).

Services provided in a building are provided by service providers located in the building at an in-building location. A building can be any type of structure or group of structures that can be occupied by one or more persons, whether covered or uncovered, contiguous or non-contiguous, man-made or natural. In some embodiments, for example, a building can be an office building, a shopping mall, or a mass-transit station. For any building, there may be one or more services provided in the building (including services provided in, at, or adjacent to the building). Services can be, for example, any good, service, or other tangible or intangible that may be of value, commercial or otherwise. For any service provided in the building, there can be one or more associated service providers. Service providers can be, for example, any human or non-human agent or apparatus (e.g., a merchant, a representative, a kiosk, etc.) that can provide a service for (e.g., provide the service to, or provide the service on behalf of) any person or organization (e.g., a consumer, client, passenger, etc.). Buildings may include one or more distinct locations therein that can be associated with a particular service or a particular service provider (e.g., the in-building location). For example, buildings such as office buildings can include one or more professional offices, buildings such as shopping malls can include one or more stores or stalls, and buildings such as mass-transit stations can include one or more terminals or platforms. Also, for example, a service provider can be a professional at a professional office, a retail merchant at a store, and or a transit vehicle or line at a transit terminal. In some embodiments, for example, the mobile-device user (101) can be a consumer of retail goods, a client of professional services, or a passenger on mass-transit services.

Various factors may discourage widespread publication of information concerning buildings, service providers, and services. For instance, concerns regarding physical security, data security, personal privacy, data relevancy or presentation, or data currency may discourage making information concerning buildings, service providers, and services generally accessible over global communication networks (e.g., the Internet). In one example, information concerning doctors' appointments may be considered private and not published for that reason. In another example, information concerning vendor stalls at a shopping center may change frequently and may not be published widely for that reason (or may be published, but be outdated). In yet another example, information concerning the physical layout of buildings may raise concerns as to the security of the building, and may not be published widely for that reason.

Accordingly, it is likely that large amounts of information concerning buildings, service providers, and services may be maintained in proprietary "information silos" and may remain inaccessible, or difficult or inefficient to access, to mobile-device users—absent the embodiments described herein. Providing such information concerning buildings, service providers, and services to on-site mobile-device users according to embodiments described herein, could, perhaps, put the information in the hands of users when they can most immediately use such information. For example, on-site mobile-device users having immediate access to information concerning buildings may be able to more effectively and more efficiently navigate within a building while the mobile-device user is in the building. Also, for example, on-site mobile-device users having immediate access to information concerning service-providers may be able to more effectively and more efficiently locate service providers within a building while the mobile-device user is in the building. Also, for example, on-site mobile-device users having immediate access to information concerning services may be able to more effectively and more efficiently learn about services provided within the building.

The above-mentioned factors discouraging widespread publication of information concerning buildings, service providers, and services can be mitigated in certain circumstances, according to various embodiments as described below. For example, such factors may be mitigated by embodiments in which the mobile-device user has been registered in a central location (such as in the registered users data 123). Also, for example, such factors may be mitigated by embodiments in which access to the information is limited to when the mobile-device user is on-site (e.g., adjacent to, approaching, entering, or within a building). Also, for example, such factors may be mitigated by embodiments in which the access to the information is limited to when the mobile-device user is at a specific location in the building (e.g., adjacent to, approaching, entering, or within the premises of a service provider). Also, for example, such factors may be mitigated by embodiments in which access to the information is limited to that which is relevant for a service for which the mobile-device user has already scheduled an appointment for a service (e.g., a scheduled service). Also, for example, such factors may be mitigated by embodiments in which access to the information is limited to that which is relevant for a service selected by a user. Even further, data regarding each of the above-mentioned mitigating circumstances may be recorded and transmitted to building staff or service providers so that building staff or service providers can take action with respect to the mitigating circumstances, including, for example, corrective action (e.g., if the access was unwarranted), or responsive action (e.g., if the access is a predicate to services being provided).

The building-server device (103) may be, in some embodiments, a central point of control to programmatically distribute data to one or more mobile-devices or one or more service-provider devices according to various programmatic controls to ensure that one or more mitigating circumstances have been satisfied. In some embodiments, the building-server device (103) provides a central point of control to enforce a global control mechanism for all data relating to information concerning a buildings, service providers operating within the building, and services to be provided in the building. This does not suggest, however, that in certain embodiments, different data may be controlled according to different control schemes, for example, recognizing different mitigating circumstances. In some embodiments, the building-server device (103) may provide a central point of distribution to enforce a global distribution mechanism for all data relating to information concerning buildings, service providers, and services. This does not suggest, however, that in certain embodiments, different data may be distributed according to different distribution schemes, for example, recognizing different mitigating circumstances.

As can be shown with reference to FIG. 1, various embodiments are provided so that one or more building-server device, such as building-server device (103), may have access to building data (120) including information concerning the building (103), service provider data (121) including information concerning service providers operating in the building (103), service data (122) including information concerning services provided in the building (103), and registered user data (123). Building data (120) can include, for example, an identifier for the building (such as a unique identifier or a building name), a description of the building, an address of the building, the positional location of the building (e.g., geographic coordinates) or parts of the building (including rooms, corridors, exits, elevators, escalators, etc.), graphical layout information (including maps, plans, images), route information (including service routes, public access routes, restricted routes, inter-floor routes, etc.). Service provider data (121) can include, for example, an identifier for the service provider (such as a unique identifier or provider name), a description of the service provider, the address of the service provider, a building for the service provider, the positional location of the service provider (e.g., geographic coordinates), a relative position of the service provider in the building, contact information (e.g., telephone number, fax number, email address, computing device identifier, IP address, MAC address, Wi-Fi access point address). Service data (122) can include, for example, an identifier for the service (such as a unique identifier or service name), the time for the service (e.g., for a scheduled service), the recipient of the service (e.g., a mobile device user identifier), a description of the service, etc. Registered user data (123) can include, for example, an identifier for the user or the user's mobile device (such as a unique identifier or user name), a communications address for the user (which can be, for example, an email address, a device address, or the identifier for the user or the user's mobile device), authentication information for the user or the user's device (e.g., password, key token, secret question/answer, etc.). Any of the above mentioned data can be stored in one or more data repositories or databases as described further herein, including, for example, as can be shown with respect to database (380) in FIG. 3.

The building-server device (103) can also communicate with the mobile device (102). A building guide module (99) can be stored at the mobile device (102) to facilitate communication with the building-server device (103) and to present one or more interfaces to a mobile-device user (101) interacting with the mobile device (102). The mobile device (102) can also have stored therein, for example, appointment data (91). The appointment data can relate to some of the services data (122), for example, according to a related key such as a service identifier, building identifier, service-provider identifier, or service-recipient identifier (this is not to suggest that the key must be identical for a relation to exist). In some embodiments, for example, the appointment data can be stored in a memory of the mobile device as is further described herein with respect to FIG. 3A.

A building-director module (98) can be stored at a building-server device (103) to facilitate the determination of mitigating circumstances, and accordingly, to distribute selected data from the building data (120), the service provider data (121), or the service data (122) to the mobile device (102). A service-provider module (97) can be stored at a service-provider device (105) to facilitate communication with the building-server device (103) and to present one or more interfaces to a service-provider user (104) interacting with the service-provider device (105). In some embodiments, the building-server device (103) may also have access to registered user data (123) including information concerning mobile devices or mobile device users that have been pre-registered (e.g., authorized) as part of the central control mechanism, e.g., so that such mobile devices or mobile device users can be authenticated during future communication sessions between the mobile device (102) and the building-server device (103). The building-director module (98) can also distribute data received from the mobile device (102) or selected data from the building data (120), the service provider data (121), or the service data (122) to the service-provider device (105). According to some embodiments, the service-provider device (105) can also have access to the building data (120), the service provider data (121), or the service data (122), for example, to provide administrative functions or enter, modify, or delete data.

One example of the operation of the building-director module (98) and the building-guide module (97) may be shown in the instance that the mobile device (102) is approaching, entering, or within the building (100). In certain embodiments, the mobile device (102) can determine that it is approaching, entering, or is in the building (100). In some embodiments, the mobile device (102) can determine its geographic position, including a geographic position within the building (100). In some embodiments, the mobile device (102) can use positioning software to determine a geographic position of the mobile device (102) and can determine that it is on-site at the building (100) based on the determined geographic position of the mobile-device (102) and based on data indicative of the geographic position of one or more buildings. For example, positioning software can determine a geographic position of the mobile device (102) responsive to wireless signals received from one or more of the following: GPS satellites, telecommunications towers, and wireless access points. The wireless signals can be received from one or more wireless access points in, at, or near the building (100), such as wireless base stations (111, 112, 113, 114, 115), which can be, for example, Wi-Fi access points. The wireless signals can also be received from other sources, as is described further herein with respect to FIG. 3A. Building records can be stored locally at the mobile-device (102), for example, in a memory as will be described in further detail below. In some embodiments, for example, building records can be stored in a remote database, such as in a building data repository, and accessible to the mobile device (102) over a communications network, as will be described in further detail below. In certain embodiments, for example, building records can be stored remotely, and selected building records can be pre-cached at the mobile device (102), for example, responsive to geographic position of the mobile device (102). In some embodiments, for example, building records can be stored at the mobile device (102) for a selection of buildings within a preselected geographic distance from the mobile device (102).

Also, in some embodiments, a separate device, such as the building server device (103) can determine that a mobile device (102) is approaching, entering, or is in the building (100). In some embodiments, for example, the building server device (103) can determine the geographic position of the mobile device (102). In one embodiment, for example, the building server device (102) can employ passive network listening to determine if communications are received at one or more wireless access points from a new mobile device (102). In one embodiment, the building server device (103) can use a device-user identifier received from the mobile device (102) to authenticate the mobile device (102) or the device user (101) based on a user account record, e.g., of the registered user data (123), including an identifier for the mobile device (102) or the device user (101). In some embodiments, the building server device (103) can determine the absolute or relative position of the mobile device (102), and if the mobile device (102) is on-site at the building (100). For example, an absolute position of the mobile device (102) may be determined based on building records, e.g., of the building data (120), including the geographic position of one or more wireless access points in communication with the mobile-device (102). Also, for example, a relative position of the mobile device (102) may be determined based on the identity of one or more wireless access points in communication with the mobile device (102). In some embodiments, passive network listening can be performed responsive to wireless signals received at one or more wireless access points in, at, or near the building (100), such as the one or more base stations (111, 112, 113, 114, 115). The building records can also be stored locally at the building server device (103), for example, in a memory as will be described further below. In other embodiments, for example, building records can be stored in a database accessible to the building server device (102), for example, over a communications network, as is described further herein.

Responsive to determining that the mobile-device (102) is on-site at the building (100), the building director module (98) can provide one or more user interfaces to the mobile-device (102) so that information concerning the building, information concerning one or more service-providers in the building, or information concerning one or more services provided in the building can be displayed to the mobile-device user (101).

One example of a user interface is an appointment selection interface, which is described further herein. The appointment selection interface can be used to select a user-desired service. In some embodiments, the user-desired service can be selected from a plurality of services to be provided for the building. In some embodiments, the user-desired service can also be selected from one or more services matching one or more appointments for the mobile-device user (101). The one or more appointments for the mobile-device user can be stored, for example, as appointment data (such as the appointment data 91) at the mobile-device (102), e.g., according to local calendar software executed on the mobile-device (102). In some embodiments, the appointment data can be stored remotely accessible to the mobile-device (102), e.g., according to cloud-based calendar software accessible to the mobile-device (102). In some embodiments, for example, the building director module (99) can transmit data indicative of the identity of the building (100) to the mobile-device (102) so that the mobile device can match one or more appointments from the appointment data to the identity of the building (100) so that only appointments relating to the building (100) are shown in the appointment selection interface. In some embodiments, for example, the building guide module (98) can determine the identity of the building (100) responsive to the position of the mobile device (102) so that the mobile device can match one or more appointments from the appointment data to the identity of the building so that only appointments relating to the building (100) are shown in the appointment selection interface.

Another example of a user interface is an inventory selection interface, which is described further herein. The inventory selection interface can be used to select a user-desired service. In some embodiments, the user-desired service can be selected from a plurality of services to be provided for the building at which the mobile device is on-site. In some embodiments, for example, the mobile device (102) can transmit a notification to the building server device (103) that the mobile device (102) is on-site, and the building server device (103) can transmit building information, service provider information, and service information to the on-site mobile device (102) responsive to the mobile device (102) being on-site. The building information, service provider information, or service information can be presented to the mobile-device user (101) using the inventory selection interface, and the mobile device user (101) can select building information, service provider information, or service information define any of a user-selected building, a user-selected service provider, or a user selected service. Based on any of the user-selected building, user-selected service provider, or user-selected service, the building server device (103) can provide to the mobile device (102) further building information, service provider information, or service information related to the selection. Also, based on any of the user-selected building, user-selected service provider, or user-selected service, the building server device (103) can perform other actions, for example, to provide navigation information to the mobile device (102) or to provide information to a service provider device (105) relating to the mobile device (102) or the mobile device user (101).

The geographic position of the mobile-device (102) within the building (100) can be used, for example, as the basis for providing information to the mobile-device (102) while the mobile device (101) is on-site at the building (100). For example, the geographic position of the mobile-device (102), in conjunction with a geographic position of a service provider location, can be used to provide in-building navigation information for a user desiring to navigate between a location of the mobile device in the building and the service provider location. In further detail, various embodiments allow a device user transporting a mobile device within an office building to receive in-building navigation information, including building maps and routes, responsive to the geographic position of the mobile device and a geographic position of a service provider location.

By way of example, FIG. 1 provides a schematic illustration of an application of embodiments of the present invention. FIG. 1 illustrates, for example, the physical positions of a mobile device (102) and a service provider (104) in a building (100). As is shown, the service provider (104) is at a certain location (106) within the building (100), and the device user (101) and the mobile device (102) are, initially, at a different position (10A) within the building (100). Other positions (10B, 10C, 10D, 10E) represent the position of the mobile device (102) over time, for example, as the device user (101) transports the mobile-device (102) in the building (100) according to embodiments of the present invention.

By way of further example, the position (10A) can represent a position of an entrance to the building (100). The position of the mobile-device (102) when the mobile-device user (101) and the mobile-device (102) enter the building can be determined, for example, responsive to communications between the mobile-device (102) and a wireless access point (111). As the mobile-device user (101) and the mobile-device (102) relocate to other locations (10B, 110C, 110D, 110E) in the building later in time, for example, the position of the mobile-device (102) can be re-determined, for example, responsive to communication with other wireless access points (112, 113, 114, 115) at the later time. Accordingly, the position of the mobile device can be tracked over time as the user transports the mobile-device (102) near, at, or in the building (101).

As is described above, the position of the mobile-device (102) can be determined either by the mobile-device (102) itself or by another device, such as building server device (102) in communication with one or more wireless access points, such as wireless access point (111). Also, as is described above, the mobile-device (102) is not limited to determining a geographic position of the mobile-device (102) through communication with the wireless access point (111); for example the geographic position of the mobile-device (102) can be determined responsive to communications with a telecommunications BTS (333), a GPS satellite (331) as is described further herein.

The position of the mobile device, e.g., position (10A), can be used, for example, to provide navigation information, for example, one or more building maps relevant to the geographic position of the mobile device and the in-building location of a service provider. The in-building location of one or more service providers within in the building (100) can be stored, for example, in one or more service provider records in the service-provider data (121). In certain embodiments, navigation information can include route information for a route in the building (101) between the position of the mobile device and the in-building location of a service provider. The position of the mobile device can be further used, for example, to provide notification information to one or more service providers in the building.

Figure 2:
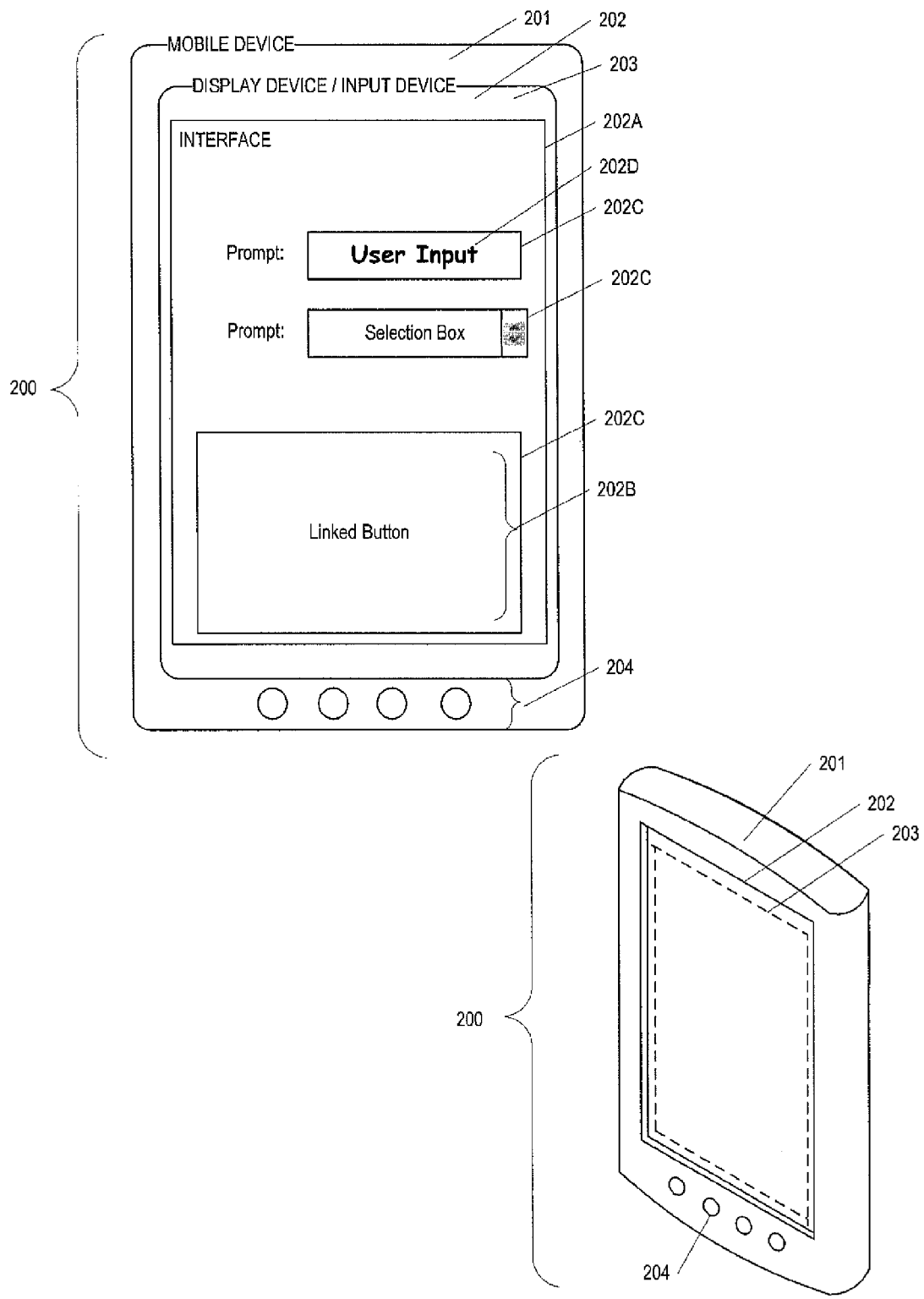
FIG. 2 includes an isometric drawing and a schematic diagram illustrating a mobile device according to various embodiments described herein.

A brief description of various user interfaces according to various embodiments of the subject invention follows with reference to FIG. 2, FIG. 2A, FIG. 2B, FIG. 2C, FIG. 2D, FIG. 2E, FIG. 2F, FIG. 2G, and FIG. 2H. With reference to FIG. 2, an exemplary mobile device, more particularly a smartphone (200) is shown. It should be noted that a smartphone (200) is illustrated for exemplary purposes only and that the following user interfaces being displayed on any other mobile device (for example a dashboard screen in an automobile) is within the scope of this disclosure.

Figure 3A:
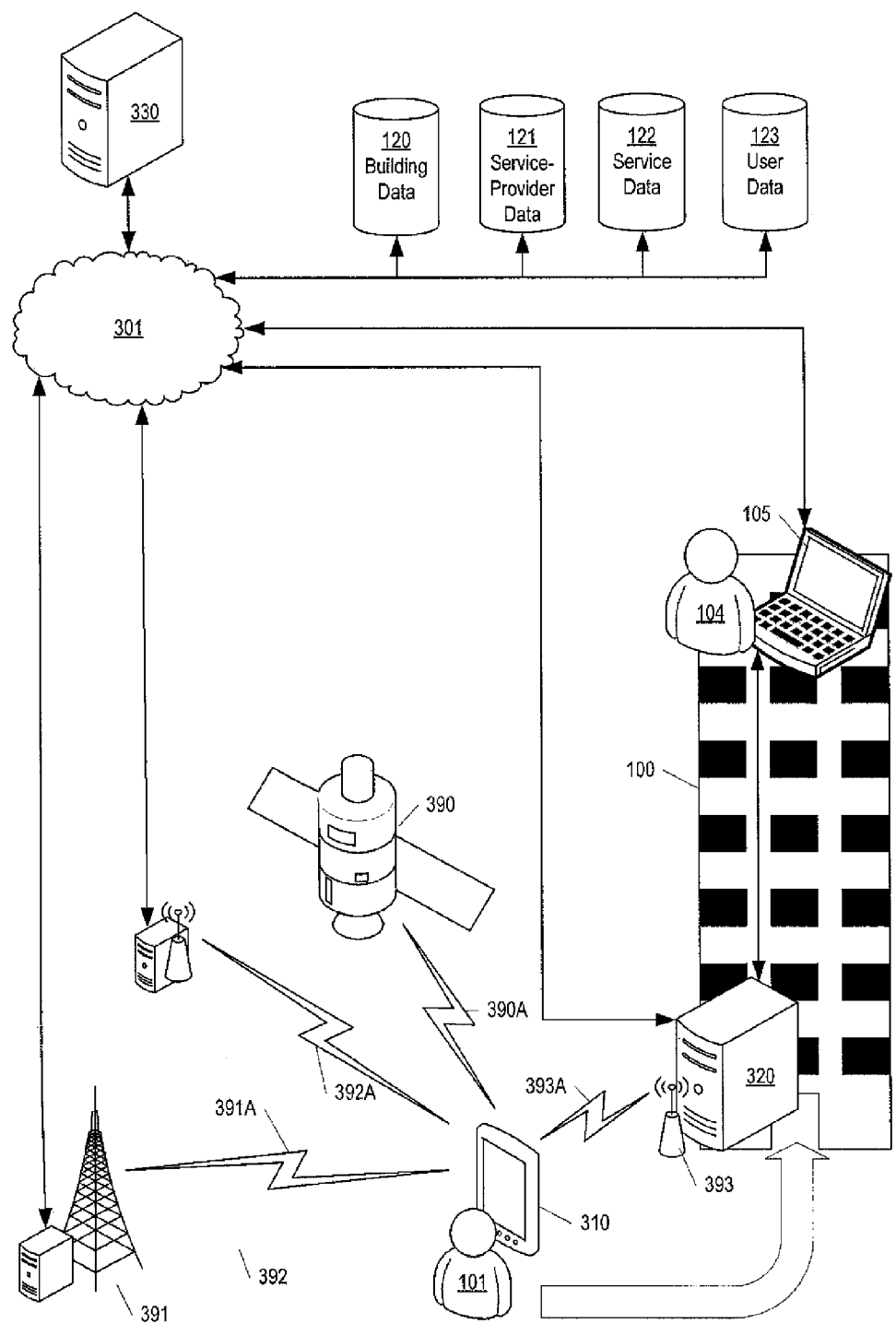
FIG. 3A includes a schematic diagram illustrating a system according to various embodiments described herein.

In further detail with respect to the smartphone (200), it can be shown that the smartphone (200) includes a housing (201) to enclose and protect the contents of the smartphone (200), which can include any of the components described of any mobile device herein, including those illustrated in FIG. 3A with respect to mobile device (310), for example. The smartphone (202) further includes a display, such as LCD display (202), at a surface of the housing and operatively visible to a user, for example, when the user holds the housing. The smartphone (202) further includes a user input interface, such as the touch-screen sensor (203), at a surface of the housing and operatively accessible to a user, for example, when the user holds the housing. The illustration of FIG. 2, however, is merely exemplary and the invention is not limited to the use of a touch sensor panel overlying the LCD display. For example, a separate keypad (204) having one or more keys can also be used, as well as other user-input devices known to those having skill in the art.

Figure 2A:
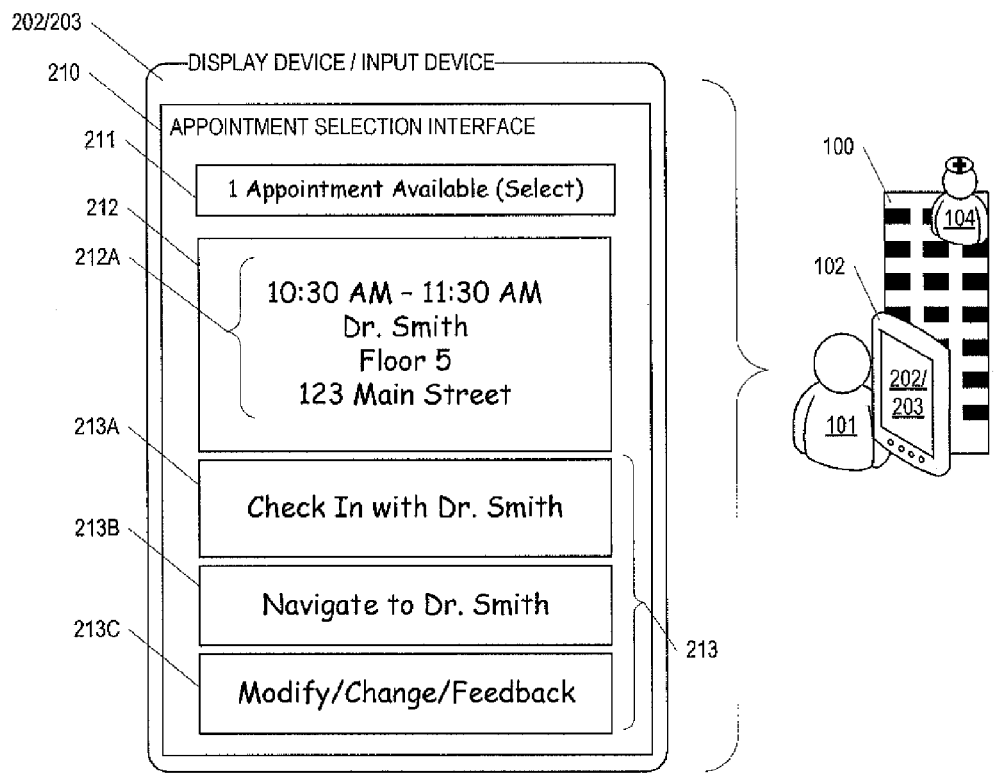
FIG. 2A includes a schematic diagram illustrating a user interface display according to various embodiments described herein.
Figure 2B:
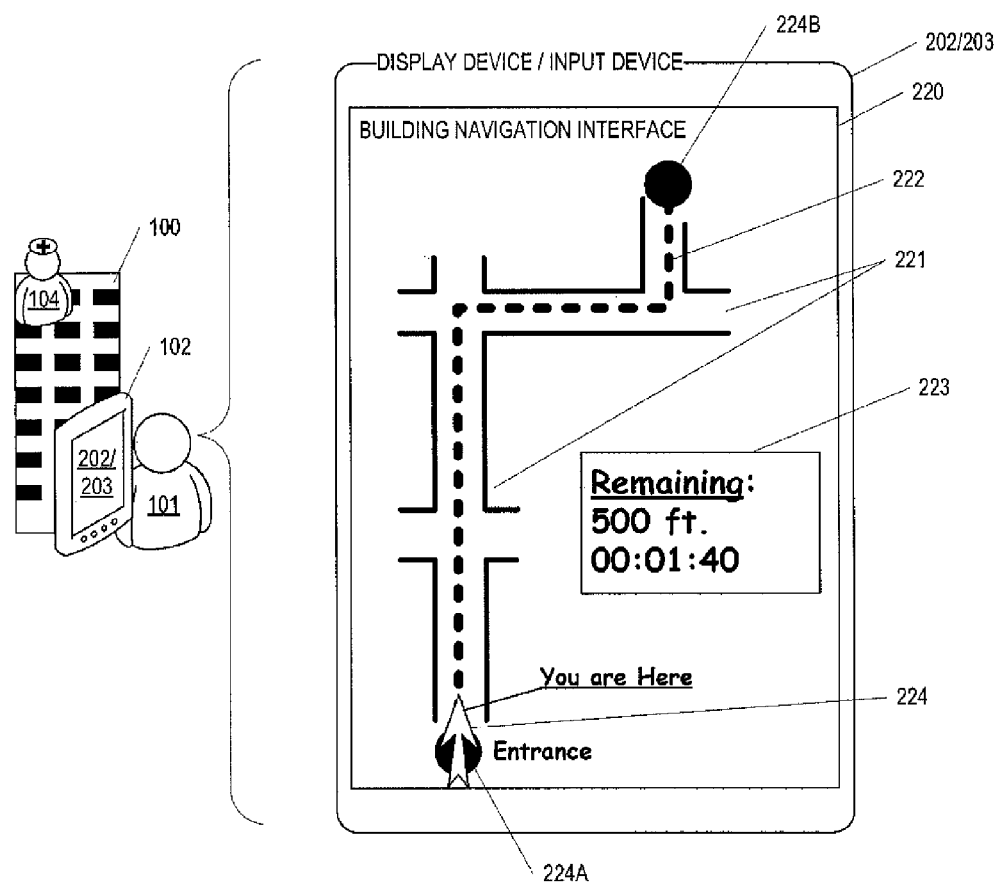
FIG. 2B includes a schematic diagram illustrating a user interface display according to various embodiments described herein.
Figure 2C:
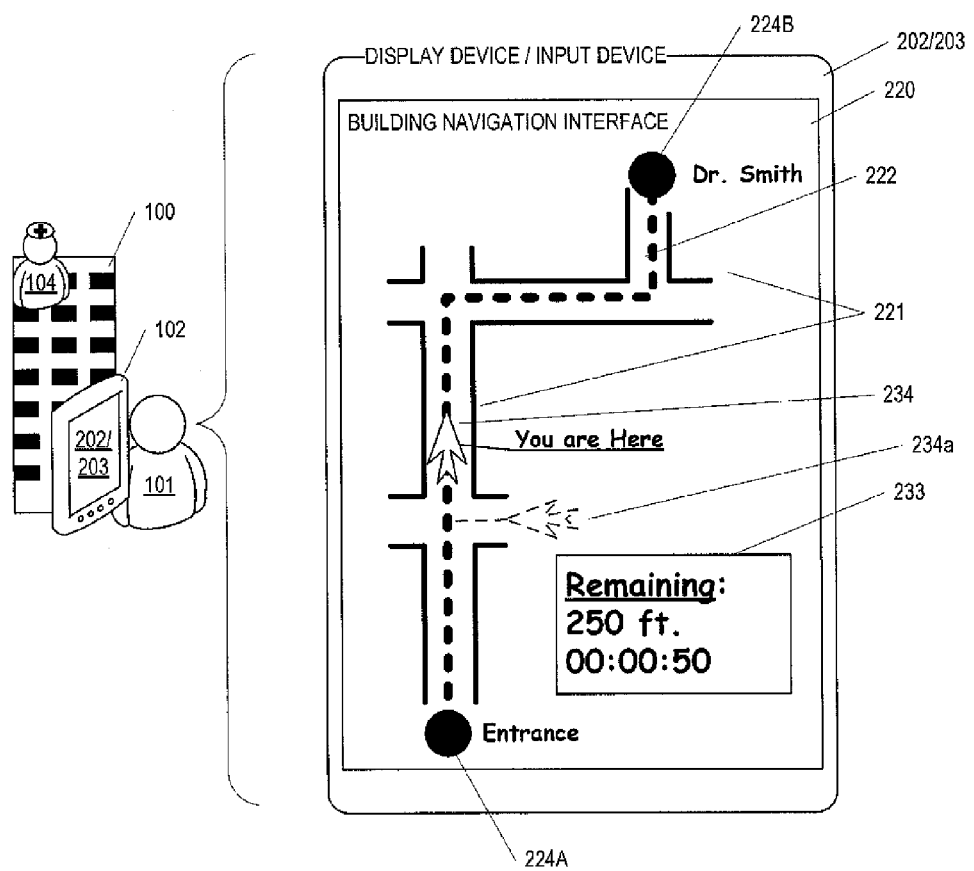
FIG. 2C includes a schematic diagram illustrating a user interface display according to various embodiments described herein.
Figure 2D:
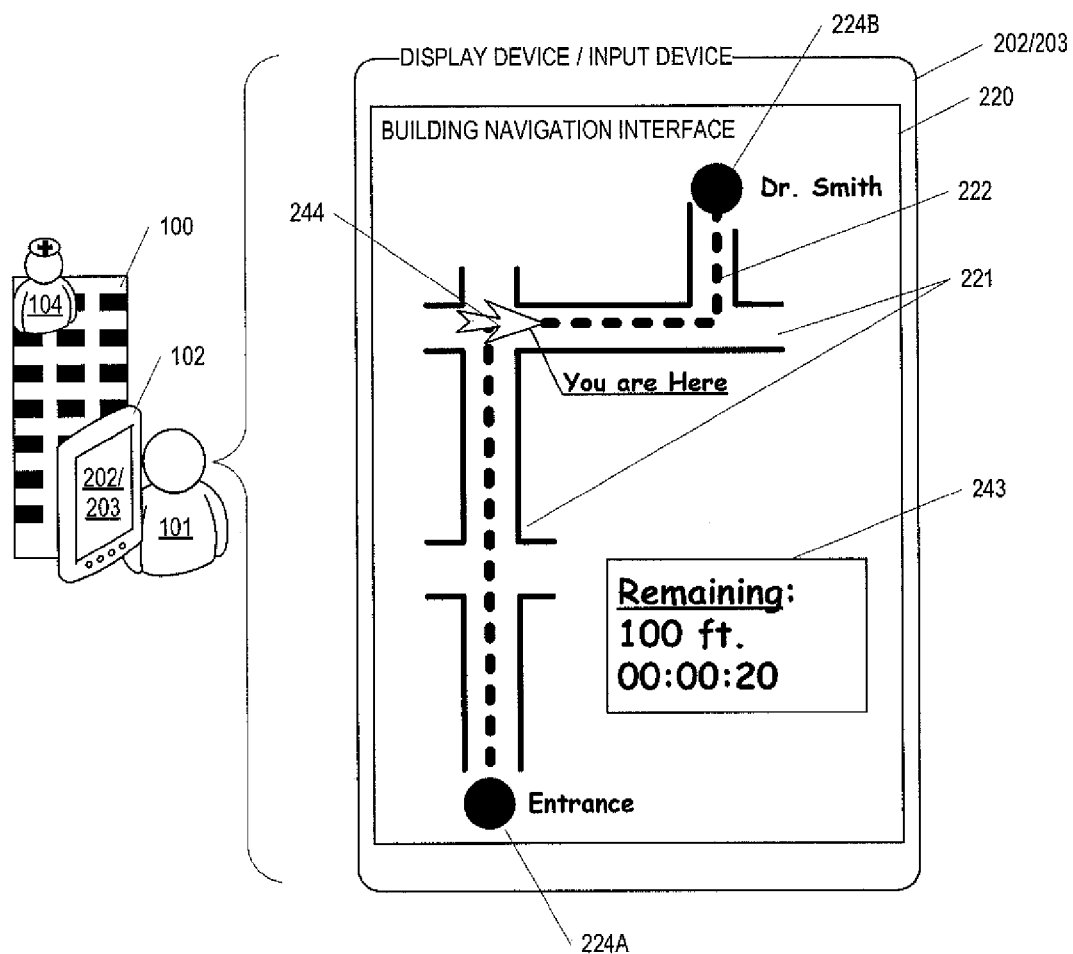
FIG. 2D includes a schematic diagram illustrating a user interface display according to various embodiments described herein.
Figure 2E:
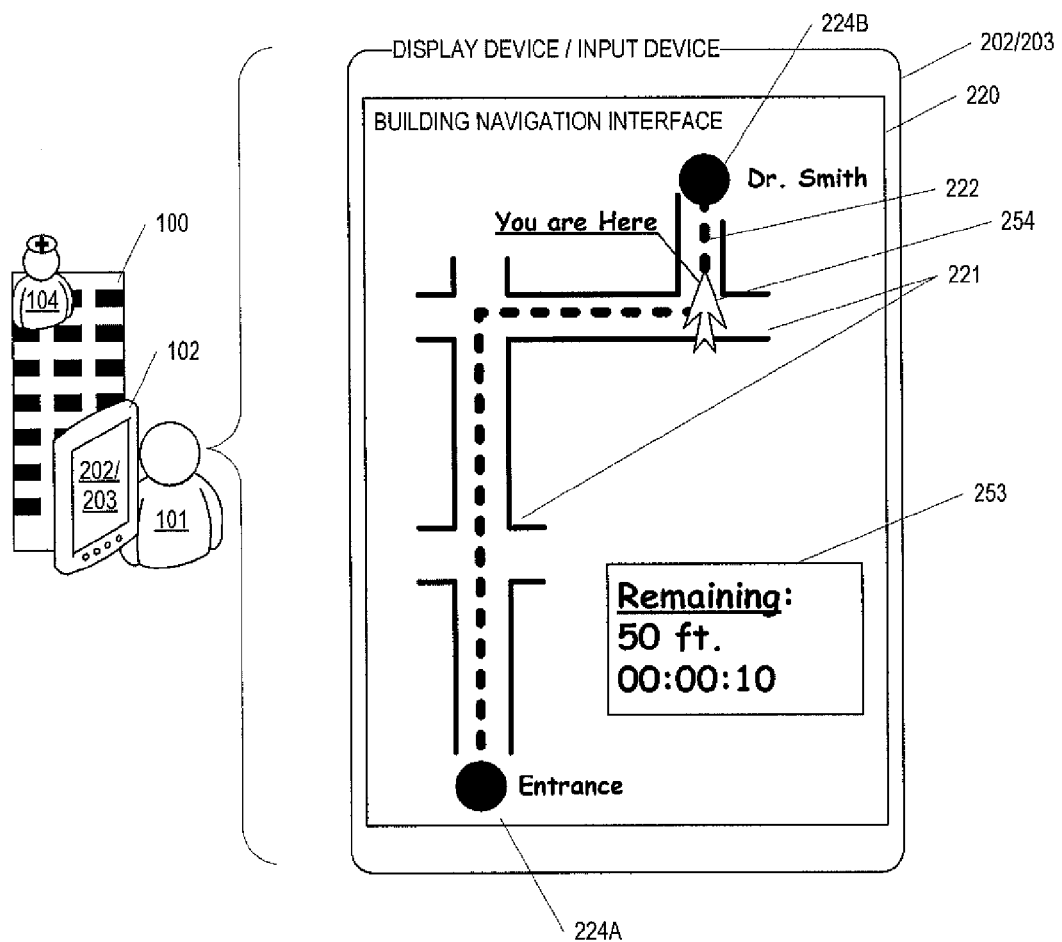
FIG. 2E includes a schematic diagram illustrating a user interface display according to various embodiments described herein.
Figure 2F:
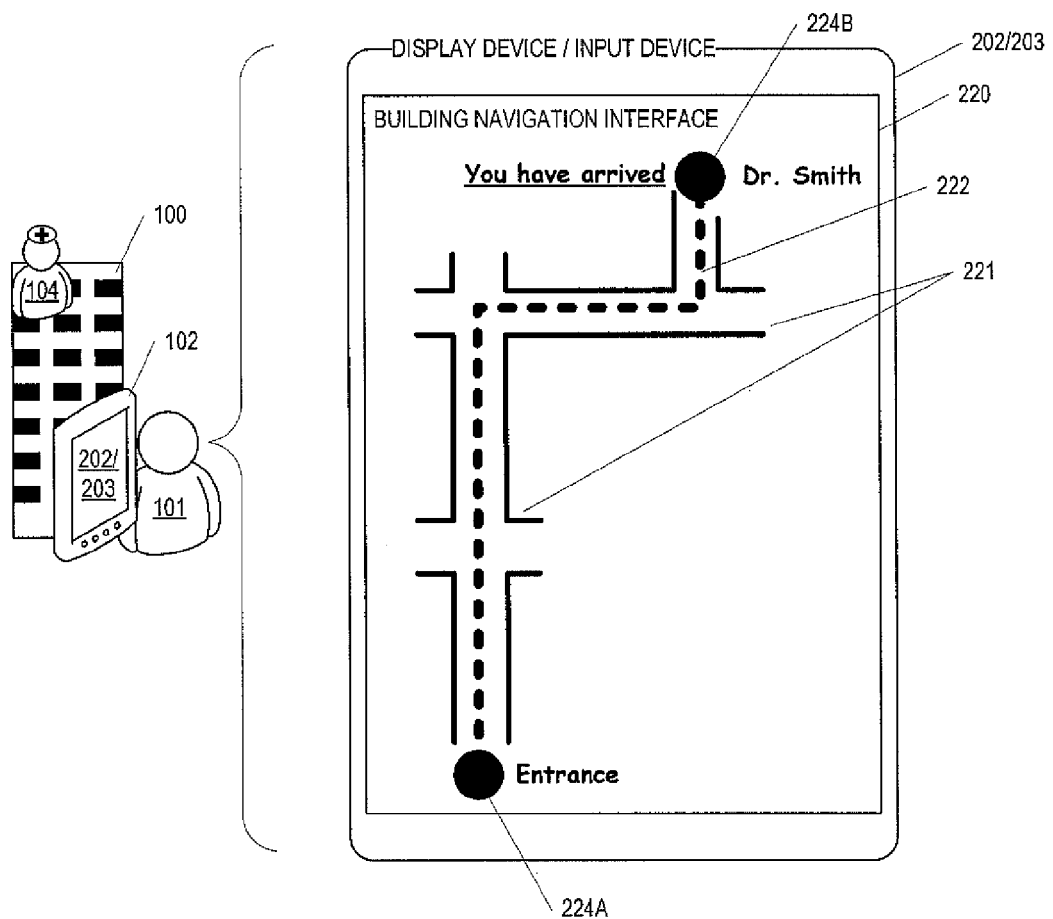
FIG. 2F includes a schematic diagram illustrating a user interface display according to various embodiments described herein.

FIG. 2A depicts an appointment selection interface (a user interface) according to various embodiments. The appointment selection interface (210) can be generated and displayed at the display (202) by an application module executed by the processor of the mobile device (200), as is described further herein. The appointment selection interface (210) can be generated, for example, when the application module is executed while the mobile-device (102) is on-site at a building corresponding to an appointment for which data indicative of the appointment is stored at the mobile device (200), such as in a memory of the mobile device (200) as is described further herein.

For example, with reference to FIG. 1, the appointment selection interface (210) can be displayed when the mobile-device user (101) transports the mobile device (102) to the entrance (10A) of the building (100). The appointment-selection interface (210) can be generated responsive to the position of the mobile-device (102) at the entrance (10A) of the building (100). In some embodiments, the position of the mobile device (102) may be determined by the mobile device (102). In some embodiments, the position of the mobile device (102) may be determined by the building-server device (103). Either the mobile device (102) or the building-server device (103), in some embodiments, can determine the position of the mobile device (either the absolute position of the mobile device or the relative position of the mobile device) responsive to signals received at the mobile device (102) from the base station (111) or responsive to signals received at the base station (111) from the mobile device (102).

According to various embodiments, the appointment selection interface (210) may include, for example, an appointment notification field (211), for example, notifying the mobile-device user (101) that an appointment is scheduled for services in the building (100). Further, the appointment selection interface can also include, for example, an appointment information field (212), including, for example, information indicative of the appointment (212A), including for example, information relating to a service, a service provider, or a building. According to various embodiments, the mobile device user (101) can view the information indicative of the appointment (212A) at the appointment information field (212) and make a selection corresponding to an appointment at one or more appointment selection field (213).

In some embodiments, each of the one or more appointment selection fields (313) is provided for particular actions with respect to an appointment. For example, in some embodiments, an appointment selection field (213) can be an appointment-check-in field (213A). The mobile-device user (101) can select the appointment-check-in field (213A), for example, to initiate transmission of a notification to the service provider (104). For example, the notification can be a notification that the mobile-device user (101) is on-site at the building (100). Also, in some embodiments, for example, an appointment selection field (213) can be a service-navigation selection field (213B). The mobile-device user (101) can select the service-navigation selection field (213B) to initiate a navigation interface to navigate the mobile-device user (101) to the in-building location of the service provider (104). Also, in some embodiments, for example, an appointment selection field (213) can be an appointment-feedback selection field (213C). The mobile-device user (101) can select the appointment-feedback selection field (213C) to initiate a data transmission to the service provider (104). For example, the data transmission can be a request to change a scheduled service, with the service provider (104), corresponding to the appointment.

FIG. 2B, FIG. 2C, FIG. 2D, FIG. 2E, and FIG. 2F depict a building-navigation interface (a user interface) according to various embodiments. The building-navigation interface (220) can be generated and displayed at the display (202) by an application module executed by the processor of the mobile device (200), as is described further herein. The building-navigation interface (220) can be generated, for example, when the application module is executed while the mobile-device (102) is on-site at a building. For example, with reference to FIG. 1, the building-navigation interface (220) can be displayed when the mobile-device user (101) transports the mobile device (102) to the entrance (10A) of the building (100) and when the mobile-device user (101) transports the mobile device (102) to different locations (10B, 10C, 10D, 10E) within the building (100). The service-navigation interface (220) can be displayed differently responsive to different positions of the mobile-device (102) at different locations (10A, 10B, 10C, 10D, 10E) within the building (100), as can be shown by comparing the service-navigation interface (220) in FIG. 2B, FIG. 2C, FIG. 2D, FIG. 2E, and FIG. 2F, corresponding to respective different locations (10A, 10B, 10C, 10D, 10E).

According to various embodiments, the service-navigation interface (220) may include, for example, a service-navigation map (221). In some embodiments, the service-navigation map (221) is dynamically generated responsive to a route (222) between the in-building locations of the mobile-device user (101) and the service-provider. In such embodiments, no more of the building map than is necessary to give context to the route (222) is shown. In other embodiments, however, more of the building map can be shown, for example, to better provide spatial reference to the mobile-device user (101) or to better convenience the mobile-device user (101). For example, hallway intersections, locations of interest (e.g., restrooms, exits, wireless hotspots, elevators, escalators, staircases, or other corridors) can be shown in the map in addition to the route. In some embodiments, the service-navigation interface (223) may also include, for example, a service-navigation status indicator (223, 233, 243, 253). In some embodiments, the service-navigation status indicator (223, 233, 243, 253) is dynamically generated and displayed responsive to the in-building locations of the mobile-device-user (101) and the service provider. In such embodiments, the service-navigation status indicator (223, 233, 243, 253) can provide data indicative of the route to the mobile-device user (101), including, for example, a remaining time parameter and a remaining distance parameter.

In some embodiments, the service-navigation interface (223) may also include, for example, a service-navigation position indicator (224, 234, 244, 254). In some embodiments, the service-navigation position indicator (224, 234, 244, 254) is dynamically displayed responsive to the in-building locations of the mobile-device-user (101) and the service provider. In some embodiments, a service-navigation position indicator (234a) can be provided even if the in-building position of the mobile-device user (101) is not positioned along the route (222), e.g., to return the mobile-device user (101) to the route (222). Various embodiments further show a location indicator (224A, 224B) for both the beginning and the end of the route (222) so that the user can visually compare the position of the navigation position indicator (e.g., 244) to the location indicator, e.g., location indicator (224B) for the in-building location of the service-provider.

Figure 2G:
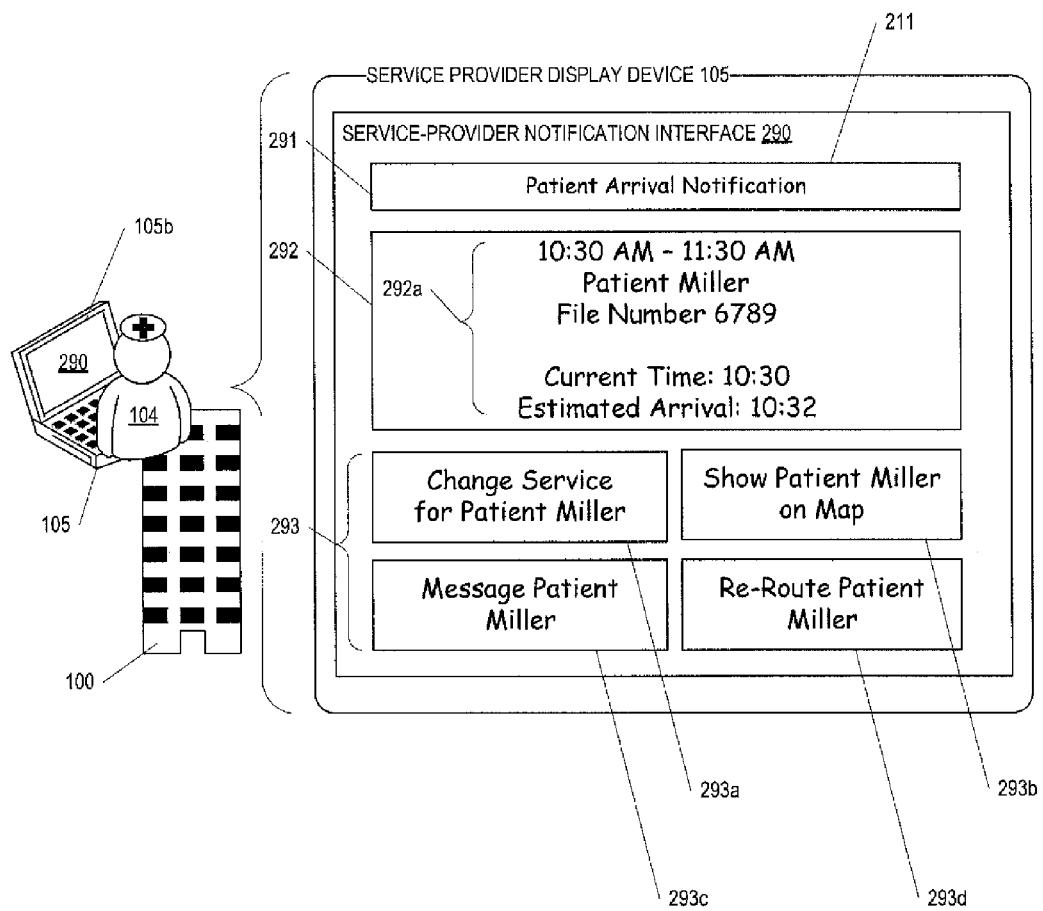
FIG. 2G includes a schematic diagram illustrating a user interface display according to various embodiments described herein.

FIG. 2G depicts a service-provider notification interface (a user interface) according to various embodiments. The service-provider notification interface (290) can be generated and displayed at the display (105b) by an application module executed by the processor of the service-provider device (105), as is described further herein. The service-provider notification interface (290) can be generated, for example, when a mobile-device (102) is on-site at a building (100) and data indicative of the appointment is stored at the mobile device (200), such as in a memory of the mobile device (200) as is described further herein, corresponds to scheduled service data for the service-provider (104).

According to various embodiments, the service-provider notification interface (290) may include, for example, a service notification field (291), for example, notifying the service-provider user (104) that a recipient of a service is on-site at the building (100). Further, the service-provider notification interface (290) can also include, for example, a service information field (292), including, for example, information indicative of the service (292A), including for example, information relating to the service, the service provider, or the building. According to various embodiments, the service-provider user (104) can view the information indicative of the service (292A) at the service information field (292) and make a selection corresponding to a service at one or more service selection field (293).

In some embodiments, each of the one or more service selection field (293) is provided for particular actions with respect to a service. For example, in some embodiments, a service selection field (293) can be a service-change field (293A). The service-provider user (104) can select the service-change field (293A), for example, to initiate a change to information indicative of the service (292A), including for example, information relating to the service, the service provider, or the building. Also, in some embodiments, for example, a service selection field (293) can be a service-navigation selection field (293B). The service-provider user (104) can select the service-navigation selection field (293B) to initiate a navigation interface to show the navigation-in-progress of the mobile-device user (101) to the in-building location of the service provider (104). Also, in some embodiments, for example, a service selection field (293) can be a service-feedback selection field (293C). The service-provider user (104) can select the service-feedback selection field (293C) to initiate a data transmission to the mobile-device user (101). For example, the data transmission can include information relating to the service, the service, provider, or the building, e.g., a confirmation number, an access code, etc. Also, in some embodiments, for example, a service selection field (293) can be a service-reroute selection field (293D). The service-provider user (104) can select the service-reroute selection field (293D) to initiate a re-routing request for the navigation of the mobile-device user (101). For example, the re-routing request can include information relating to a new in-building location for the service provider or information relating to an alternate route to the in-building location for the service provider, e.g., a particular waypoint or corridor in the building.

Systems, methods, computer programs, and user interfaces are provided to allow one or more mobile devices approaching, entering, or being in a building to receive information relating to one or more services in the building, including navigation information relating to the one or more services in the building; and to allow one or more service provider devices to receive information relating to the one or more mobile devices approaching, entering, or being in the building. Embodiments are further provided to determine when one or more mobile devices approaching, entering, or being in a building. Embodiments are further provided to allow the one or more mobile devices approaching, entering, or being in a building to receive information relating to one or more services in the building. Such services can include scheduled services in the building, wherein the scheduled service is scheduled in both the mobile device (e.g., as an appointment in a calendar application) and another computing device, for example, the service provider device.

Figure 2H:
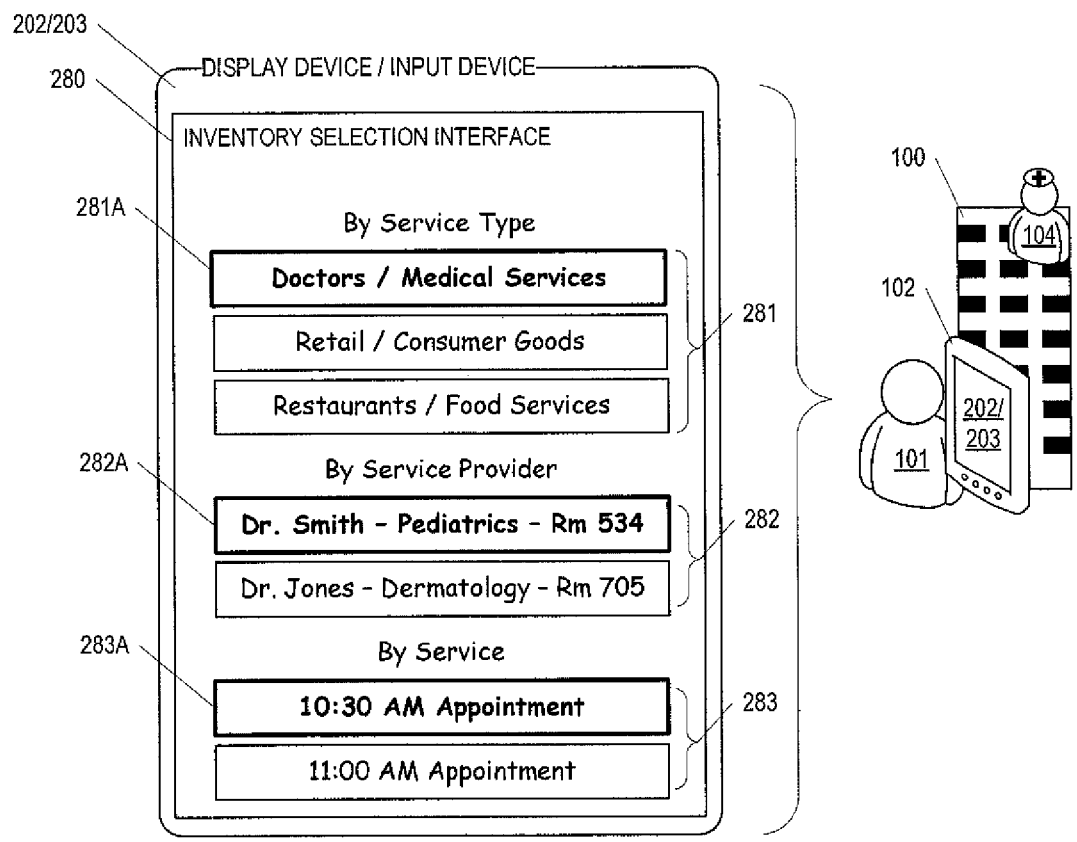
FIG. 2H includes a schematic diagram illustrating a user interface display according to various embodiments described herein.

FIG. 2H depicts an inventory selection interface (a user interface) according to various embodiments. The inventory selection interface (280) can be generated and displayed at the display (105b) by an application module executed by the processor of the service-provider device (105), as is described further herein. The inventory selection interface (280) can be generated, for example, when a mobile-device (102) is on-site at a building (100).

According to various embodiments, the inventory selection interface (280) may include, for example, a building identification notification field (289), for example, notifying the mobile-device user (101) as to the identity of the building (100). Further, the inventory selection interface (280) can also include, for example, a service-type selection field (281), including, for example, information indicative of one or more service types in the building (281A). Further, the inventory selection interface (280) can also include, for example, a service-provider selection field (282), including, for example, information indicative of one or more service provider in the building (282A). In some embodiments, only those service providers for the user-selected service type, such as service type (281A) are shown in the service-provider selection field (282). Further, the inventory selection interface (280) can also include, for example, a service selection field (283), including, for example, information indicative of one or more service provider in the building (283A). In some embodiments, only those services for the user-selected service provider, such as service provider (282A) are shown in the service selection field (282). According to various embodiments, the mobile-device user (101) can view the information indicative of the one or more service types, the one or more service providers, and the one or more services and make a selection corresponding selection at the corresponding selection field. The user-selected service, for example, at service selection field (283), can be the user-selected service or the user-desired service, and service-specific navigation and service-provider notification can be provided with respect thereto. Although not depicted in FIG. 2H, any other building data, service provider data, and service data can be included in the inventory selection interface (280), subject to appropriate schemes for data security, data privacy, etc. based on, for example, user account permissions in the registered users data or, for example, the positional location of the mobile-device user (102) or the existence of a corresponding appointment (for a service) relating to the mobile-device (101) or the mobile device-user (102).

Systems, methods, computer programs, and user interfaces are provided to allow one or more mobile devices approaching, entering, or being in a building to receive information relating to one or more services in the building, including navigation information relating to the one or more services in the building; and to allow one or more service provider devices to receive information relating to the one or more mobile devices approaching, entering, or being in the building. Embodiments are further provided to determine when one or more mobile devices approaching, entering, or being in a building. Embodiments are further provided to allow the one or more mobile devices approaching, entering, or being in a building to receive information relating to one or more services in the building. Such services can include scheduled services in the building, wherein the scheduled service is scheduled in both the mobile device (e.g., as an appointment in a calendar application) and another computing device, for example, the service provider device.

FIG. 3A depicts various embodiments of systems including one or more mobile devices in communication with one or more server devices, such as mobile device (310) in communication with server devices (320, 330). Although mobile device (310) can be a hand-held unit as illustrated in several drawings including FIG. 3A and FIG. 1, the mobile device (310) can be any computing device that can be readily transported from one location to another location during the operation of the computing device. In certain embodiments, mobile device, such as mobile device (310), can be a smartphone (such as smartphone (200) as can be shown with reference to FIG. 2), a cell phone, a personal digital assistant ("PDA"), a tablet computer, or a laptop computer, for example. In other embodiments, mobile device can be a computer in a car, such as an in-dash computer system.

A human user of the mobile device (310) can be shown with reference to the mobile-device user (101). The term "mobile-device-user" as an adjective can be used herein to describe any property, preference, parameter, or other attribute of either the mobile device (310) or the user (101), including, for example, account data that is unique to the user, unique to the device, or unique to both the user and the device. As will be appreciated by those having skill in the art, any mobile device described herein can have more than one user, either simultaneously or sequentially, and use of terms "device user" and "device-user" in the singular are not intended to imply that there cannot be different device users, unless specifically stated otherwise.

Figure 3B:
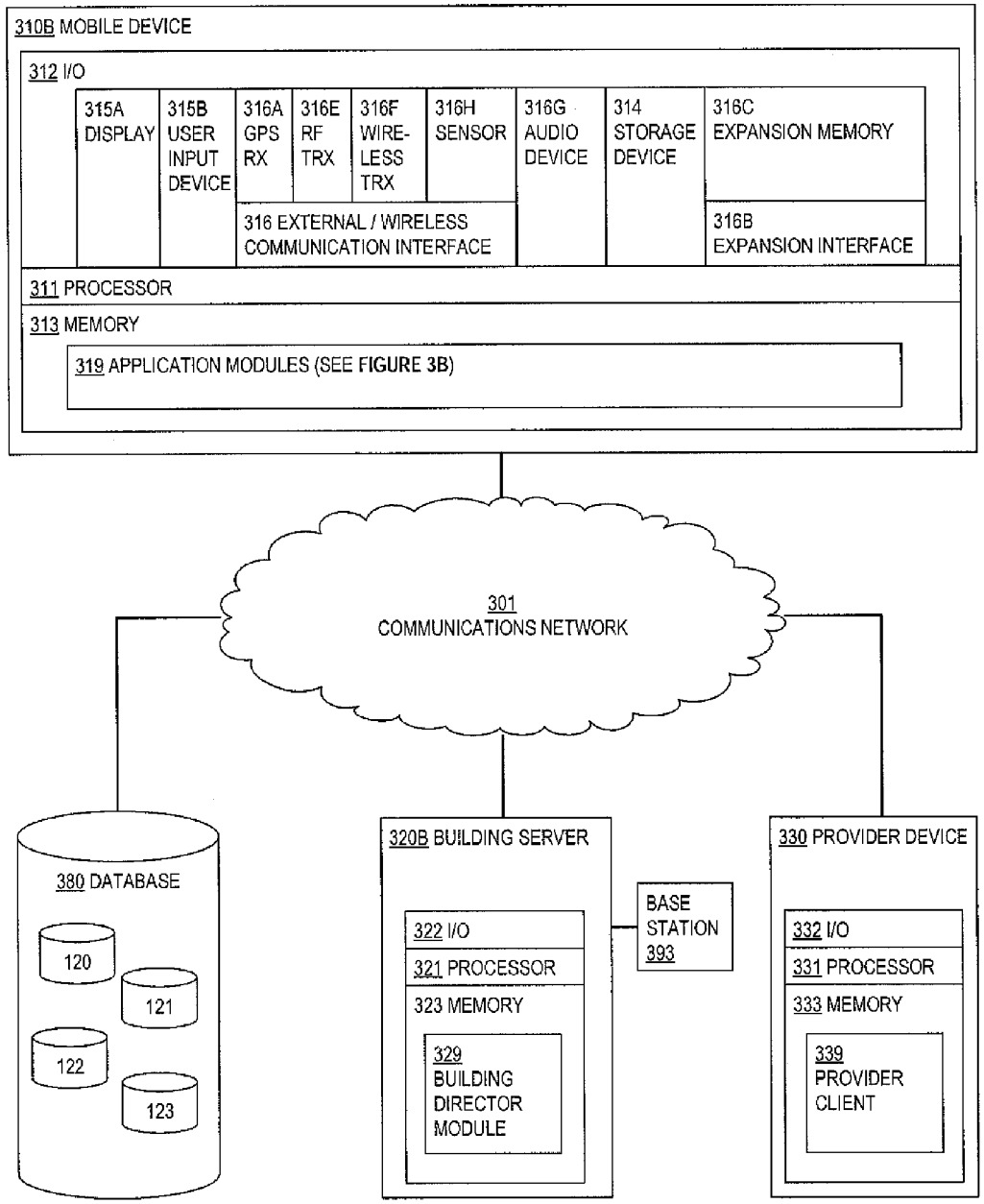
FIG. 3B includes a schematic diagram illustrating a system according to various embodiments described herein.

In more particular detail, embodiments of the present invention include mobile device (310) configured as shown with respect to the mobile device (310B) in FIG. 3B, which can include a processor (311), an input-output unit ("I/O") (312) in communication with the processor, and a memory (313) in communication with the processor (311), and other components as are described further herein. FIG. 3B depicts that there can be stored on the mobile device (310B) one or more application modules (319), for example in the memory (311), each of which can be positioned in communication among each other according to various APIs (application programming interfaces), standards, or protocols.

Mobile device (310) can be in communication with one or more computing devices (320, 330) through a communications network (301) including, for example, a telecommunications network. Communication through a telecommunications network can be provided, for example, using a radio frequency communication link (391A) to one or more telecommunications base transceiver stations ("BTS") (391) (which can include telecommunications towers or antennae as illustrated) being in communication with one or more communications networks (301), such as telecommunication networks or the Internet. Mobile device (310) can also be communicatively coupled with one or more computing devices (320, 330) through the communications network (301), for example, using a local-area wireless network. Communication through a local-area wireless network can be provided, for example, using a radio frequency communication link (393A) to one or more wireless access points (393) being in communication with a communications network (301), such as the Internet.

In some embodiments, computing devices (320, 330) may be configured as the computing devices (320B, 330B) shown with reference to FIG. 3B, and can include a processor (321, 331), an input-output unit ("I/O") (322, 332) in communication with the processor, and a memory (323, 333) in communication with the processor (321, 331), and other components as is described further herein. Computing device (320, 320B) can be, for example, a building server as shown with respect to building-server device (103) in FIG. 1. Computing device (330, 330B) can be, for example, a service-provider computer as shown with respect to service-provider device (105) in FIG. 1, which can be used by a service-provider user (104).

One or more application modules, such as computer program product (329), may also be stored on the computing device (320B), for example in the memory (323). In some embodiments, one or more application modules stored on the computing device (320B) may be remotely accessible to the mobile device as a client in a client-server architecture, for example, through the communication network (301). Also, one or more application modules, such as computer program product (339), may also be stored on the computing device (330B), for example in the memory (333). In some embodiments, one or more application modules stored on the computing device (330B) may be remotely accessible to the service-provider device (330) as a client in a client-server architecture, for example, through the communication network (301).

In various embodiments of the present invention, one or more application modules can be configured to allow one or more on-site mobile devices to receive information relating to one or more services in the building. Information relating to one or more services in the building can include, for example, navigation information relating to the one or more services in the building. One or more application modules can be further configured to detect when one or more mobile devices are adjacent to, approaching, entering, or within a building (e.g., on-site mobile devices). One or more application modules can be further configured to allow one or more service provider devices to receive information relating to one or more on-site mobile devices. The one or more application modules can be further configured to allow the one or more on-site mobile devices to receive information relating to one or more scheduled services in the building. For instance, the scheduled service may be scheduled in memory (e.g., according to a calendar function) of both the mobile device and another computing device, for example, the service provider device.

The application modules can be executed by a respective processor (311, 321, 331) of one or more different computing devices. User input required for such execution may be received at a user input interface, such as the user input interface (315B) of the mobile device (310B). In certain embodiments, the user input interface (315B) can be, for example, on a touch-screen sensor (203) (overlaid on a display (202)) or a keypad (204), which can be shown with reference to the smartphone (200) illustrated in FIG. 2. Visual output from such execution may be displayed at a display (315A) of the mobile device (310B). In some embodiments, the display (315A) can be, for example, an LCD display (202), which can be shown with reference to the smartphone (200).

Figure 3C:
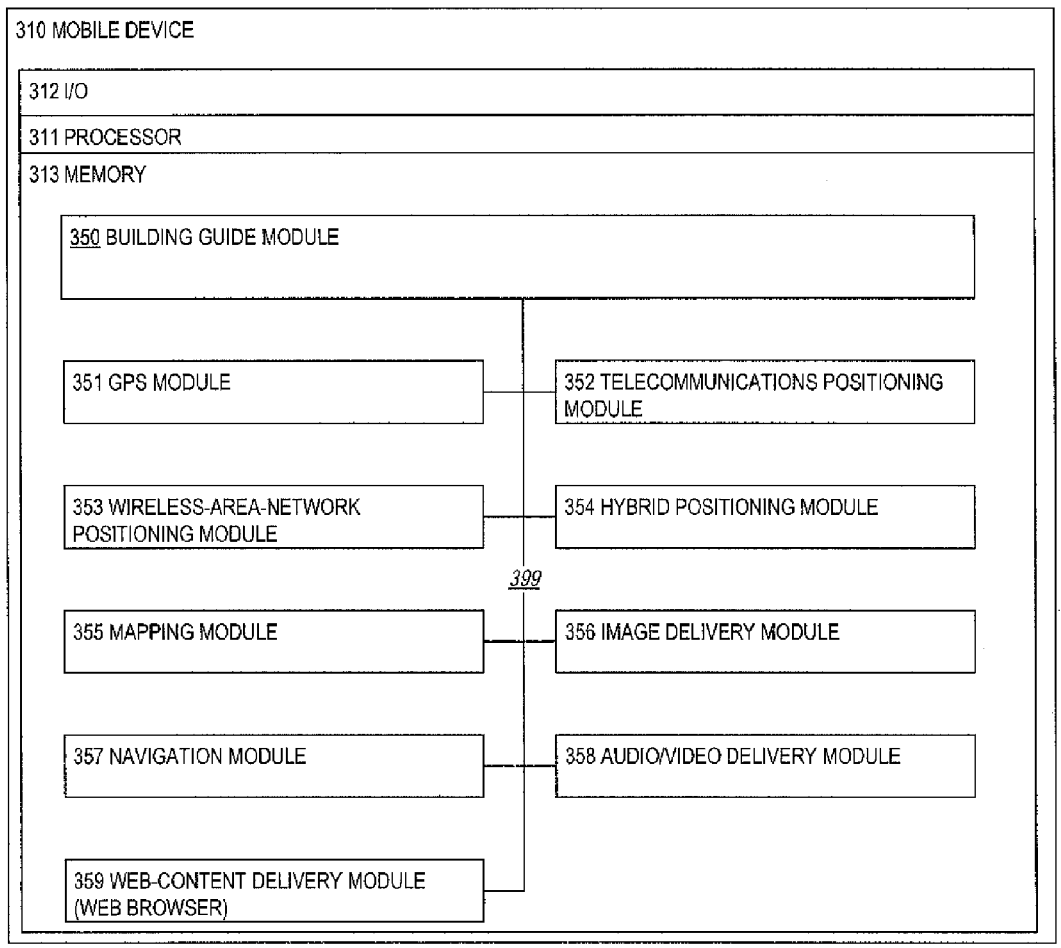
FIG. 3C includes a schematic diagram illustrating a system according to various embodiments described herein.

The application modules can include, for example, one or more applications known to those having skill in the art, such as mapping software, navigation software, web-browsing software, mail-client software, SMS messaging software, camera software, content delivery software (e.g., for playback or other presentation of audio/visual media), position-determining software and the like, some of which are illustrated in FIG. 3C. Although various specimens of each of the foregoing types of software may be, individually, apparent to those having skill in the art, a brief description of selected types of known software is provided as follows so as to provide context.

Positioning-determining software may include, for example, a GPS module (351) configured to process Global Positioning System ("GPS") signals (332) received at a GPS receiver (316A). GPS satellites (331) broadcast timing signals by radio frequency to the GPS receiver (316A). This allows GPS module (351) to accurately determine the current position (longitude, latitude, and altitude). The GPS module (351) receives the GPS timing signals at the GPS receiver (316A), and outputs corresponding position data (e.g., as coordinates x, y, z) for the device. The position data may then be provided to any other application module according to various APIs (399).

Positioning-determining software may further include, for example, a telecommunications positioning module (352) configured to process telecommunications signals (334) received at an RF transceiver (316E). Telecommunications base transceiver stations ("BTS") (333) may broadcast telecommunications signals by radio frequency to the RF transceiver (316E). The telecommunications positioning module (352) is configured to determine the position of the device based on the telecommunications signals, which may be implemented according to a number of techniques, such as triangulation, trilateration, or multilateration (hyperbolic positioning) and any of a number of location protocols (e.g., Radio Resource Location Protocol ("RRLP"), TIA 801, RRC (Radio Resource Control) Position Protocol, LTE (Long Term Evolution) Positioning Protocol, etc.), which will be known to those having skill in the art. The telecommunications positioning module (352) receives the telecommunications signals at the RF transceiver (316E) and outputs corresponding position data (e.g., as coordinates x, y, z) for the device. The position data may then be provided to any other application module, e.g., according to various APIs (399).

Positioning-determining software may further include, for example, a local-area wireless positioning module (353) configured to process wireless signals (336) received at a wireless transceiver (316F). Wireless access points ("WAP") (335) broadcast wireless signals by radio frequency to the wireless transceiver (316F). The wireless positioning module (353) may be configured to accurately determine the position of the device responsive to the wireless signals, which may be implemented according to any of several known techniques, such as triangulation, trilateration, or multilateration (hyperbolic positioning) and any of various protocols as will be known to those having skill in the art. This allows the wireless positioning module (353) to accurately determine the current position. Advantageously, wireless positioning module (353) is better suited to determine the current position when the mobile device is indoors or in an "urban canyon" where GPS signals or telecommunications signals may be substantially shielded or attenuated. The wireless positioning module (353) receives the wireless signals at the wireless transceiver (316F), and outputs corresponding position data (e.g., as coordinates x, y, z) for the device. The position data may then be provided to any other application module according to various APIs (399).

Positioning-determining software may further include, for example, a hybrid positioning module (354) configured to process any one or more signals or types of signals (including GPS signals (332), telecommunications signals (334), wireless signals (336) or other wireless signals (339)) received at any one or more receiver or sensors (including GPS receiver (316A), RF transceiver (316E), wireless transceiver (316F), or other sensor (316H)). Other wireless signals (339) may include, for example, radio frequency identification ("RFID") signals, ultrawide band ("UWB") signals, infrared signals, visible light communication ("VLC") signals, and acoustic (e.g., ultrasound) signals; and other sensors (316H) may include, for example, RFID sensors, UWB receivers, infrared sensors, VLC sensors, and acoustic sensors. Other types of signals and sensors will be known to those having skill in the art. The hybrid positioning module (354) may be configured to accurately determine the position of the device responsive to any one or more of the foregoing signals, which may be implemented according to any of several techniques, such as triangulation, trilateration, or multilateration (hyperbolic positioning) and any of several positioning protocols. This allows the hybrid positioning module (354) to accurately determine the current position. The hybrid positioning module (354) receives the one or more signals at any of the foregoing receivers or sensors, and outputs corresponding position data (e.g., as coordinates x, y, z) for the device. The position data may then be provided to any other application module according to various APIs (399).

The foregoing description of a GPS module (351), a telecommunications positioning module (352), a wireless positioning module (353), and a hybrid positioning module (354) are exemplary and is not intended to limit the scope of the invention. For example, positioning software may be a module that combines any of the described features of the GPS module (351), the telecommunications positioning module (352), wireless positioning module (353), the hybrid positioning module (354), as well as any other features not described herein (which is not to suggest that other groups of features are comprehensive) into any one or more modules which may be stored locally on one device or distributed across several devices and made accessible to any one or more application modules according to various APIs (399) Accordingly, any instruction or step described herein including positioning data or the determination of a position of a device may include any one or more of the foregoing techniques involving any one or more of the GPS module (351), a telecommunications positioning module (352), a wireless positioning module (353), and a hybrid positioning module (354) or like modules being executed on other similarly-equipped devices.

Mapping software may include, for example, a mapping module (355) configured to receive position data and map data and to display any of the map data responsive to the position data. Navigation software may include, for example, a navigation module (357) configured to receive position data for two or more points of interest and map data and to display any of the map data responsive to the position data for the two or more points of interest, which may be implemented, for example, in conjunction with mapping software, such as mapping module (355).

The map data describes the geographic location and geographically distributed objects, such as features (e.g., points of interest, cities, service provider locations, building floor plans, etc.), human movement corridors (e.g., roads, paths, trails, walkways, stairways, elevators, escalators, moving walkways, ferry routes, train routes, bus routes, etc.), and boundaries (e.g., rivers, county boundaries, state boundaries, country boundaries, etc.). Map data may be stored in the form of points, polylines, polygons, imagery, or some other format and may be associated with geographic location data. The map data may be organized in mapping layers in which different layers contain different categories of map data. Mapping queries may be performed among mapping layers by performing spatial comparisons (e.g., comparing for intersections, comparison for disjointedness, etc.) of the shapes in each of the mapping layers. In an example of an embodiment, map data can be stored in the building database (120) in communication with the communications network (301) and accessible to one or more computing devices in communication with the communications network (301) according to various APIs, standards, or protocols.

In some embodiments, the mapping module (355) may receive position data and map data, select or determine map data relating to the position data ("target map data"), and display any of the target map data at the display (315A). Navigation queries may be performed among mapping layers by performing route-optimization or route-intelligence algorithms (e.g., using graph networks) responsive to the geographic location of features (e.g., the nodes in a graph network) and the geographic location of human movement corridors (e.g., the edges in a graph network). In some embodiments, the navigation module (357) may receive position data for two or more points of interest and map data, determine map data relating to a route (e.g., a direction-specific sequence of one or more sections of one or more human movement corridors) between the two or more points of interest from the map data ("route map data"), and display any of the route map data at the display. The navigation module (357) may also generate a mapping layer responsive to the route map data ("route layer"), the mapping layer to be accessed by the mapping module (355) so that the route layer may be displayed at the display (315A) in conjunction with the target map data.

The foregoing description of a mapping module (355) and a navigation module (357) are exemplary and is not intended to limit the scope of the invention. For example, mapping software may be any module that combines any of the described features of the mapping module (355) and the navigation module (357), as well as any other features not described herein (which is not to suggest that other groups of features are comprehensive) into any one or more modules which may be stored locally on one device or distributed across several devices according to various APIs (399).

Content-delivery software may include, for example, any of an audio/video delivery module (358), an image delivery module (356), a web-content delivery module (359), and other media-delivery modules. An audio/video delivery module (358), for example a media player application, may be configured, for example, to process audio, video, or audio/video content that is stored in memory of any device (whether in non-transitory or transitory memory) (including to stream audio, video, or audio/video content that is stored in memory of another device and transmitted over the communications network (301)), and present such content to a device user, for example, through the display (315A) or the audio device (316G) and a speaker. An image-content delivery module (356), for example a conventional picture viewer or slideshow viewer, can be configured, for example, to process image content, such as JPEG files (Joint Photographic Experts Group standard) or other image files, may be stored in memory of a device (whether in non-transitory or transitory memory) (including to retrieve or to stream any such content that is stored in memory of another device), and present such content to a device user, for example, through the display (315A). A web content delivery module (359), for example a conventional web browser, can be configured, for example, to process any digital content, such as hypertext markup language ("HTML"), extensible markup language ("XML"), plain text, client-side scripts, client-side applets, images, audio, video, audio/video content, and various other types of digital content (whether static or dynamic, whether standards-based or proprietary) may be stored in memory of a device (whether in non-transitory or transitory memory) (including to retrieve or to stream any such content that is stored in memory of another device), and present such content to a device user, for example, through the display (315A) or the audio device (3160) and a speaker.

The foregoing description of an audio/video delivery module (358), an image delivery module (358), and a web-content delivery module (359) are exemplary and is not intended to limit the scope of the invention. For example, content-delivery software may be any module that combines any of the described features of the audio/video delivery module (358), an image delivery module (358), and a web-content delivery module (359), as well as other features not described herein (which is not to suggest that other groups of features are comprehensive) into any one or more modules which may be stored locally on one device or distributed across several devices.

As shown in FIG. 2, FIG. 2A, FIG. 2B, FIG. 2C, FIG. 2D, FIG. 2E, FIG. 2F, and FIG. 2G, one or more of the application modules described herein may display to the user one or more user interfaces, such as an example of a user interface (202A), any of which may be a graphical user interface ("GUI"), at the display (315A), such as the LCD display (202). The one or more user interfaces may present various types of information (202B) to a user of the mobile device, including to prompt the user of the mobile device for input (202B) associated with the information presented to the user using a user-selection field (202C). Although the user-selection field (202C) is illustrated in part as a text input box, the user-selection field may be any type of field at the user interface (202A), whether apparent to the user or not, that may collect user input from the user-input interface (315B), e.g., a checkbox, a radio button, a selection box, a drop-down selection box, linked text, linked images, linked image map, a gesture field, and like features or techniques that will be apparent to those having skill in the art. The one or more user interfaces may also receive the user input (202D) at the user-selection field (202C) and transmit the user input to an application module, regardless of whether the destination application module is the same application module that generated the user interface. Although the user input (202D) is illustrated as freely-entered text, the user input may be any type of data that can be input or selected by a user, as well as any data relating to or associated with data that can be input or selected by a user. For example, a user may enter a gesture of a horizontal swipe at a gesture field, and the "user input" may be any data (e.g., a command to horizontally scroll an image) that can be associated with the recognized gesture. Also, for example, a user may speak spoken words into a microphone of the mobile device, and the "user input" may be any data (e.g., a speech-recognition transcription of the spoken words) that can be associated with the spoken words. The user input transmitted to an application module may be received by an application module in any format and for any purpose, for example, as stored in memory to be accessible to an executing application or as an argument or parameter passed in a command line or function call to initiate the execution of an application or script.

FIG. 3B depicts certain embodiments including a building director module (329), which can be a computer program stored in the memory (323) of the building server device (320B) and executable on the processor (321) of the building server device (320B). The building director module (329), when executed, can perform one or more of the computer implemented methods or steps of such methods described further herein and as can be shown with reference to FIG. 4, FIG. 5, FIG. 6, FIG. 7, FIG. 8, FIG. 9, FIG. 10. FIG. 3B also depicts certain embodiments including a building guide module (350), which can be a computer program stored in the memory (313) of the mobile device (310B) and executable on the processor (311) of the mobile device (310B). The building guide module (350), when executed, can perform one or more of the computer implemented methods or steps of such methods described herein and as can be shown with reference to FIG. 5. In other embodiments, however, one or more of the following steps may be performed by other modules or by more than one module, for example, executing on one or more processors and being stored at one or more memories or storage devices of one or more computing devices or databases.

Figure 4:
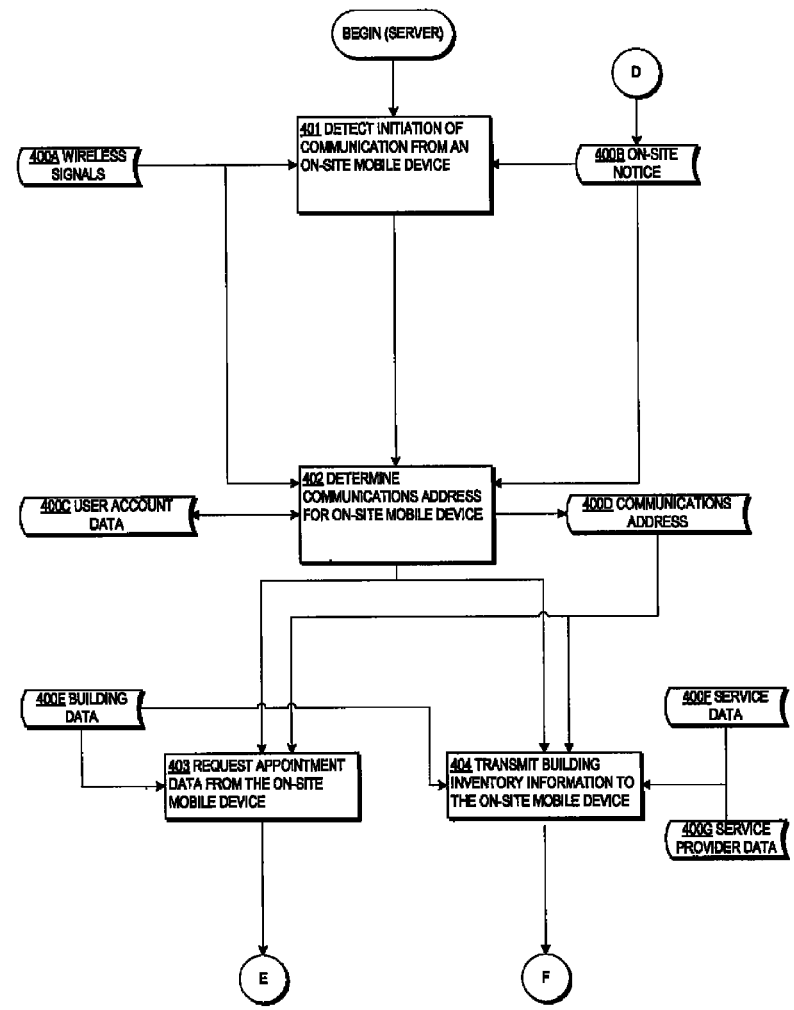
FIG. 4 includes a flowchart illustrating method steps according to various embodiments described herein.

FIG. 4 further depicts embodiments of computer implemented methods including the step of detecting (401) an initiation of communications from an on-site mobile device. The detecting (401) step can be performed, for example, by the building server device (320) executing one or more application modules, including the building director module (329), which can be configured to perform the step.

The detecting (401) step can include, for example, analyzing wireless signals (400A) received at base stations (e.g., a wireless access point) positioned within or adjacent to the building, transmitted from one or more on-site mobile devices. The wireless signals (400A) can include, for example, information indicative of the identity of a mobile device or of a user of the mobile device. The identity of the mobile device or the identity of the user of the mobile device may be determined, for example, by the building director module (329).

Figure 5:
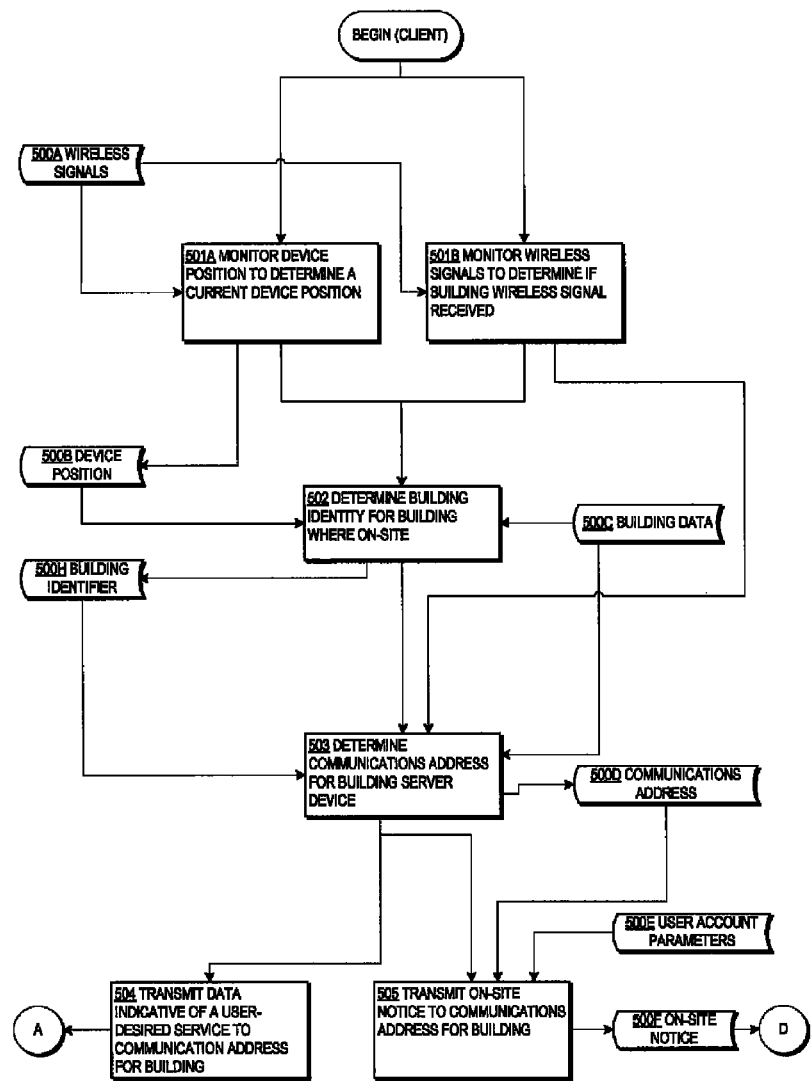
FIG. 5 includes a flowchart illustrating method steps according to various embodiments described herein.

In some embodiments, for example, the detecting (401) step can include, for example, receiving and processing an on-site notice (400B) transmitted by one or more mobile devices, as is described further herein with respect to FIG. 5.

The on-site notice (400B) may be received by the building director module (329), for example, through a communications network, such as the communications network (301), including any wide-area network, local-area network, and the Internet.

FIG. 5 depicts embodiments of computer implemented methods including a step of repeatedly, obtaining (501A) a device-user position (500B). The obtaining (501A) step can be performed, for example, by an on-site mobile device executing one or more application modules, including the building guide module (319), which can be configured to perform the step. The device-user position (500B) can be obtained (501A) responsive to one or more wireless signals (500A) having position information, such as one or more GPS signals, telecommunication RF (radio frequency) signals, WAN (wide area network) RF signals, RFID (radio frequency identification) signals, optical signals, or acoustic signals. The term "base station" as used herein refers to any apparatus, such as a transmitter, transceiver, transponder, transverter, repeater, or other transmission device to transmit wireless signals. Although a base station, such as BTS (333), is illustrated as being a fixed infrastructure apparatus, a BTS can be a mobile or temporary, for example, including mobile devices, e.g., a mobile hot spot. Position information may be communicated by the wireless signal (e.g., the signal may encode information relating to the identity of, or the position of, the base station or the base station's location). Obtaining (501A) the device-user position (500B) can also include calculating the device-user position (500B) from one or more properties of the wireless signals as received, for example, at a receiver or transceiver (e.g., time difference of arrival, time-of-flight, angle of arrival, etc.). For example, the device-user position can be obtained using positioning software, such as the GPS module (351), the telecommunications positioning module (352), the wireless positioning module (353), or the hybrid positioning module (354).

Further, in some embodiments, the mobile device can repeatedly monitor (501B) for wireless signals (500A) to determine if a wireless signal is received including information relating to a specific building ("building wireless signals"). The building wireless signals (500A) can include, for example, information indicative of the identity of a building or of a service provider in the building so that the identity of the building or the identity of the service provider in the building may be determined, for example, by the building guide module (319). For example, in some embodiments, a radio-frequency beacon can transmit a regular sequence of signals, some of which are unique to a building (or a location in a building).

FIG. 5 further depicts embodiments of computer implemented methods including the step of determining (502) whether the device position (500B) indicates that the mobile device is currently on-site at a particular building of a plurality of buildings. The determining (502) step can be performed, for example, by an on-site mobile device (310) executing one or more application modules, including the building guide module (319), which can be configured to perform the step. The determining (502) step can be performed, for example, responsive to building data (500C) including, for example, building position information, e.g., for a building entrance, a building center, or a building point-of-interest. Searching or querying the building data (500C) may, for example, return one or more building identifier (500H) for buildings having building position information relating to the device position (500B) as described herein (an exact match is not required, as positions can be related by a proximity factor, for example, 0.25 miles). In some embodiments, whether a device position (500B) is related to a building position means can be determined responsive to one or more proximity parameters (not shown). In certain embodiments, the device position may be related to the building position because the building position is within a spatial radius from the device position. The spatial radius, for example, can be a preselected radius or an adaptive radius and can be determined (not shown) responsive to any relevant constant or variable, for example device-user parameters such as the speed of the user, preferences of the user, fidelity of positioning signals, and so on. The foregoing parameters or constraints are not universal for all embodiments and all users and may be either fixed, variable (e.g., adaptive) for any one or group of users.

According to certain embodiments, further confirmation that the device-user is actually on-site at the building can be provided, for example, using 1-dimensional or 2-dimensional barcodes, such as by dynamic QR ("Quick Response") codes present at the building (i.e., which might be in a closer vicinity to the device-user than a wireless base station might be). A barcode, such as a QR code, can be received at the mobile device through an input interface (e.g., a camera) of the mobile device. Barcodes can further include information indicative of the building (e.g., at least part of a visual pattern being unique to the building), which can be compared to the information indicative of the building received through wireless signals to confirm that the user is on-site at the building. In other embodiments, other forms of near-field communication (e.g., Bluetooth) can similarly provide confirmation that the device-user is actually on-site at the building.

FIG. 5 further depicts embodiments of computer implemented methods including the step of determining (503) a communications address (500D) for the building server device for a building. The determining (503) step can be performed, for example, by an on-site mobile device (310) executing one or more application modules, including the building guide module (319), which can be configured to perform the step. A communications address (500D) for the building server device can be determined, for example, responsive to matching the building identifier (500H) to one or more communications addresses (500D) in the building data (500C). Various techniques for searching or querying the building profile data (500C) may return one or more communications identifiers (500D) as described herein. The communications address for a building server device may be referenced by the mobile device to transmit communications to the building server device. FIG. 5 further depicts embodiments of computer implemented methods including the step of transmitting (505) an on-site notification (500F) to the building server device. The transmitting (505) step can be performed, for example, by an on-site mobile device (310) executing one or more application modules, including the building guide module (319), which can be configured to perform the step. The transmitting (505) can be performed using the determined communications address (500D) to transmit a communication according available protocols. The on-site notification (500F) is information that the building director module (329) is configured to acknowledge as indicative of an on-site mobile device, and can include information relating to the mobile device, the device user, including, for example, user parameters (500E), or information indicative of user-selected services or user-selected service providers. Accordingly, the on-site notification (500F/500B) can be received/detected (401) to initiate steps described further herein with reference to FIG. 4.

FIG. 4 further depicts embodiments of computer implemented methods including the step of determining (402) a communications address (400D) for the on-site mobile device. The determining (402) step can be performed, for example, by the building server device (320) executing one or more application modules, including the building director module (329), which can be configured to perform the step. A communications address for a mobile device may be referenced by the mobile device to transmit communications to the building server device according available protocols. In some embodiments, a communications address (400D) for the on-site mobile device can be determined, for example, by parsing data transmitted in the wireless signals (400A), for example, the wireless signals (400A) can provide the communications address (400D). The communications address (400D) for the on-site mobile device can also be determined, for example, responsive to matching data transmitted in the wireless signals (400A), such as a device-user identifier (not shown), to one or more communications addresses (500D) in the user data (400C), e.g., in a user account profile. Further, in some embodiments, a communications address (400D) for the on-site mobile device can be determined, for example, from the on-site notice (400B) including the communications address. Further, in some embodiments, the communications address (400D) for the on-site mobile device can also be determined, for example, responsive to matching data transmitted in the on-site notice (400B), such as a device-user identifier (not shown), to one or more communications addresses (500D) in user data (400C). Various techniques for searching or querying the user account data (400C) may return one or more communications addresses (400D) as described herein.

FIG. 4 further depicts embodiments of computer implemented methods including the step of transmitting (403) a request for appointment data to the on-site mobile device. The transmitting (403) step can be performed, for example, by the building server device (320) executing one or more application modules, including the building director module (329), which can be configured to perform the step. The transmitting (403) step can be performed, for example, responsive to the communications address (400D). The request can include, for example, building data (400E). For example, the request can include a building identifier (not shown) of the building data (400E), for example, such that the on-site mobile device can match the building identifier to appointment data that relates to the building identifier. The request for appointment data can be received and processed by the on-site mobile device as is described further herein with respect to FIG. 7.

FIG. 4 further depicts embodiments of computer implemented methods including the step of transmitting (404) building inventory information to the on-site mobile device. The transmitting (404) step can be performed, for example, by the building server device (320) executing one or more application modules, including the building director module (329), which can be configured to perform the step. The transmitting (404) step can be performed, for example, using the communications address (400D) for the on-site mobile device. The building inventory information can include, for example, any of the building data (400E), any of the service data (400F), or any of the service provider data (400G). For example, the building inventory information can include information indicate of one or more service providers operating in the building or of one or more services provided in the building. By way of further example, building inventory information can include building information, such as in-building location information relating to the one or more service providers or the one or more services. By way of further example, building inventory information can include, for example, a list of available appointment times for services provided by a service provider or a list of available service providers and a list of selected services.

Figure 6:
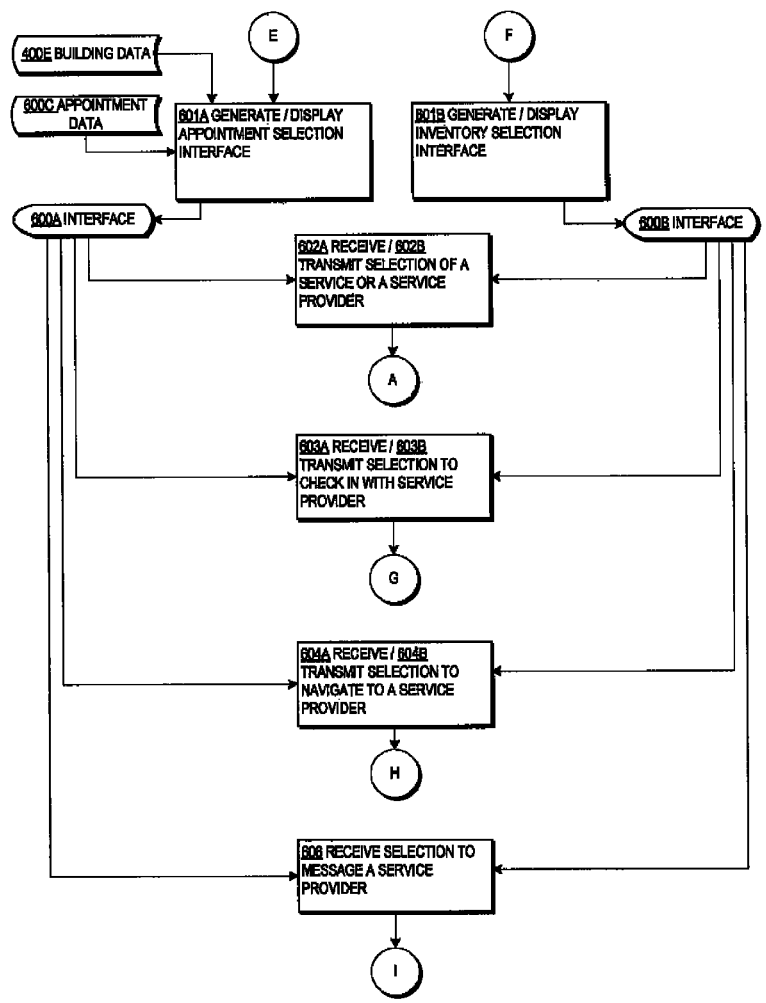
FIG. 6 includes a flowchart illustrating method steps according to various embodiments described herein.

FIG. 6 depicts embodiments of computer implemented methods including the steps of generating and displaying (601A) an appointment selection interface (600A). The generating and displaying (601A) steps can be performed, for example, by a mobile device (310) executing an application module, such as the building guide module (319) configured to perform such steps. The appointment selection interface (600A) can be displayed to a human device-user, for example, interacting with the mobile device (310). The appointment selection interface (600A) can include, for example, those features and functionality described herein with reference to FIG. 2 and FIGS. 2B-2F, as well as the building data (400E) and any appointment data (600C) matching the building data (400E), such as appointment data (600C) stored at the mobile device (310) or on a remote server (not shown) accessible to the mobile device (310), e.g., calendar entries. Responsive to user interaction with the appointment selection interface (600A), such as user-selections, various application modules, such as the building guide module (319), can be configured to receive such user-selections and to transmit user-selections to any other application module, for example, such as, for example, to the building director module (329).

In an example of an embodiment, the appointment selection interface (600A) can be configured to receive (602A), from the user, a user-selected service (not shown) or a user-selected service provider (not shown) and transmit (602B) the user-selected service (not shown) or the user-selected service provider (not shown) to one or more application modules, such as the building director module (329). In another example of an embodiment, the appointment selection interface (600A) can be configured to receive (603A), from the user, a selection (not shown) to check in with a service provider and to transmit (603B) such a selection (not shown) to one or more application modules, such as the building director module (329). In another example of an embodiment, the appointment selection interface (600A) can be configured to receive (604A), from the user, a selection (not shown) to navigate to a service provider and to transmit (604B) such a selection (not shown) to one or more application modules, such as the building director module (329). In another example of an embodiment, the appointment selection interface (600A) can be configured to receive (606A), from the user, a selection (not shown) to submit feedback to a service provider and to transmit (606B) such a selection (not shown) to one or more application modules, such as the building director module (329).

In certain embodiments of the invention, as can be shown with reference to FIG. 6, computer implemented methods can include the steps of generating and displaying (601B) an inventory selection interface (600B). The generating and displaying (601B) steps can be performed, for example, by a mobile device (310) executing an application module, such as the building guide module (319) configured to perform such steps. The inventory selection interface (600B) can be displayed to a human device-user, for example, interacting with the mobile device (310). The inventory selection interface (600B) can include, for example, those features and functionality described herein with reference to FIG. 2 and FIG. 2H. Responsive to user interaction with the inventory selection interface (600B), such as user-selections, various application modules, such as the building guide module (319), can be configured to receive such user-selections and to transmit user-selections to any other application module, including an application executing on the building director module (329).

In an example of an embodiment, the inventory selection interface (600B) can be configured to receive (602A), from the user, a user-selected service (not shown) or a user-selected service provider (not shown) and transmit (602B) the user-selected service (not shown) or the user-selected service provider (not shown) to one or more application modules, such as the building director module (329). In another example of an embodiment, the inventory selection interface (600B) can be configured to receive (603A), from the user, a selection (not shown) to check-in with a service provider and to transmit (603B) such a selection (not shown) to one or more application modules, such as the building director module (329). As used herein, checking-in with a service provider is intended to describe notifying a service-provider of the presence of the device-user at or near the building of the service provider. In another example of an embodiment, the inventory selection interface (600B) can be configured to receive (604A), from the user, a selection (not shown) to navigate to a service provider and to transmit (604B) such a selection (not shown) to one or more application modules, such as the building director module (329). In another example of an embodiment, the inventory selection interface (600B) can be configured to receive (606A), from the user, a selection (not shown) to submit any other information (e.g., a "message") to a service provider and to transmit (606B) such a selection (not shown) to one or more application modules, such as the building director module (329). In certain embodiments, such a message may include, for example, payment instructions or authorization, payment or account information (e.g., credit card numbers), or other instructions or information relating to a service (e.g., hotel check-in information, hotel check-out instructions, medical insurance information, etc.).

Figure 7:
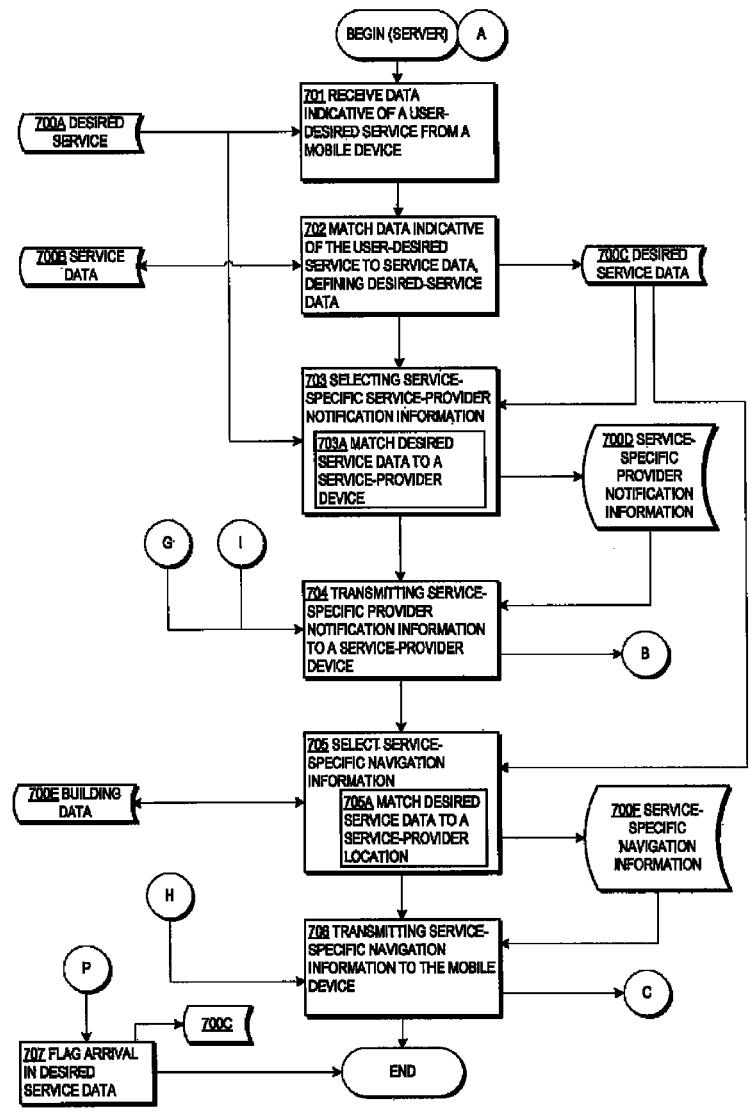
FIG. 7 includes a flowchart illustrating method steps according to various embodiments described herein.

FIG. 7 depicts embodiments of computer implemented methods including the step of receiving (701) data indicative of a user-desired service (700A) (referred to herein as a "user-desired service" or, simply, as a "desired service") from a mobile device. The data indicative of a user-desired service (700A) can be, for example, a user-selected service or a user-selected service provider as is described herein with respect to the receipt (602A) and transmission (602B) of the same. The receiving (701) step can be performed, for example, by a building server device (320) executing an application module configured to perform the step. Data indicative of a desired service can include, for example, the selection of a service or of a service provider described herein with respect to FIG. 6, for example. The data indicative of a desired service can include any data matching to one or more services in the service data (700B), e.g., through a literal match or an approximate match. By way of example, data indicative of a desired service can include a service provider name and an appointment time, which can match, for example, to a service provider name and a scheduled service time in the service data (700B).

FIG. 7 further depicts embodiments of computer implemented methods including the step of matching (7021) the data indicative of a user-desired service (700A) to data relating to the user-desired service in the service data (700B) to define desired-service data (700C). The desired-service data (700C) includes, for example, any data in the building data (700E), the service provider data (not shown) and the service data (700B) relating to the user-desired service (700A). By way of example, the desired service data can include, for example, a building identifier, a service provider identifier, and a scheduled service time.

FIG. 7 further depicts embodiments of computer implemented methods including the step of selecting (703) service-specific service provider notification information (700D).

The selecting (703) step can be performed, for example, by a building server device (320) executing an application module configured to perform the step. The service-specific notification information (700D) includes, for example, data indicative of the desired service (700A) or desired service data (700C) and relates to an actual service to be provided in the building by a service provider. By way of example, the service-specific provider notification information (700D) includes, for example, a user-selected service, a request to check in with a service provider, a request to navigate to a service provider, or feedback for a service provider. The service-specific service provider notification information (700D) can be selected, for example, from the desired service data (700C) or from the service provider data (700F). The selection (703) step can be performed, for example, responsive to any of the data indicative of a user-desired service (700A), any of the data in the desired service data (700C), or any of the data in the service provider data (700F). The step of selecting (703) service-specific service provider notification information (700D), for example, can include the step of matching (703A) desired-service data (700C) to a communications address for a service provider device (703B) associated with the desired service data, which can be included in the service-specific provider notification information (700D). The communications address for a service provider device (703B) can be referenced by the building server device, for example, to transmit communications to a respective service provider device according to available protocols.

FIG. 7 further depicts embodiments of computer implemented methods including the step of transmitting (704) the service-specific provider notification information (700D) to any other module, for example, the service provider client module (772). The transmitting (704) step can be performed, for example, by a service provider device (720) executing an application module configured to perform the step. The service-specific provider notification information (700D) can be transmitted (704), for example, responsive to the communications address for the service provider device (703), according to available protocols. In certain embodiments, the transmitting (704) step can be performed responsive to receiving, e.g., at the building director module (329), user a selection (not shown) to check in with a service provider upon such a selection being transmitted (603B), e.g., by the building guide module (319). In other embodiments, for example, the service-specific provider notification information (700D) can include a message (not shown) from a user received, e.g., at the building director module (329), responsive to a user a selection (not shown) to message a service provider upon such a message being transmitted (606B), e.g., by the building guide module (319). In certain embodiments, the transmitting (704) step can be performed responsive to receiving such a message (not shown).

FIG. 7 further depicts embodiments of computer implemented methods including the step of selecting (705) service-specific navigation information (700F). The selecting (705) step can be performed, for example, by a building server device (320) executing an application module configured to perform the step. The service-specific navigation information can include, for example, the relative or absolution position of the mobile device, the relative or absolute position of the service provider for the desired service (e.g., the in-building location) as well as any determined routes, navigation information (e.g. turn-by-turn instructions), and map information (e.g., map images, map layer information) to navigate from the position of the mobile device to the position of a service provider for the desired service. The service-specific navigation information (700F) can be selected, for example, from the desired service data (700C), from the service provider data (700F), or from the building data (700E). The selection (705) step can be performed, for example, responsive to any of the data indicative of a user-desired service (700A), any of the data in the desired service data (700C), or any of the data in the service provider data (700F).

In certain embodiments, the selecting (705) step can include matching (705A) desired-service data (700C) to an in-building location for a service provider (705B) associated with the desired service data, which can be included in the service-specific navigation information (700F). The in-building location for a service provider (705B) can include, for example, relative or absolute positioning information for a service provider location that is in the building. The positioning information can be, for example, geographic positioning information relating to the position of the in-building location for the service provider in relation to the earth surface (e.g., geographic coordinates). The positioning information can also be, for example, relative positioning information relating the position of the in-building location for a service provider to a reference location of the building (e.g., a main entrance, a center point, a point of interest, etc.)

FIG. 7 further depicts embodiments of computer implemented methods including the step of transmitting (706) the service-specific navigation information (700F) to another application module or another computing device, for example, to the service provider device (330) executing the service provider client module (339). The transmitting (706) step can be performed, for example, by a building server device (320) executing an application module, such as the building director module (329) configured to perform the step. In certain embodiments, for example, the service-specific navigation information (700F) can be transmitted (706) using a device address or a communications address associated with the on-site mobile device, according to available protocols. The device address or the communications address can be provided by the on-site mobile device and received by the building server device, for example, in any of the wireless signals (400A) or the on-site notice (400B) as is described further herein with respect to FIG. 4. The service-specific navigation information (700F) can be transmitted, for example, according to available protocols recognized by mapping software executed by the mobile device. In even further embodiments, for example, the transmitting (706) step can be performed responsive to receiving, e.g., thought the building director module (329), a user selection (not shown) to navigate to a service provider upon such a selection being transmitted (604B), e.g., by the building guide module (319) as is described further herein with respect to FIG. 6.

Figure 8:
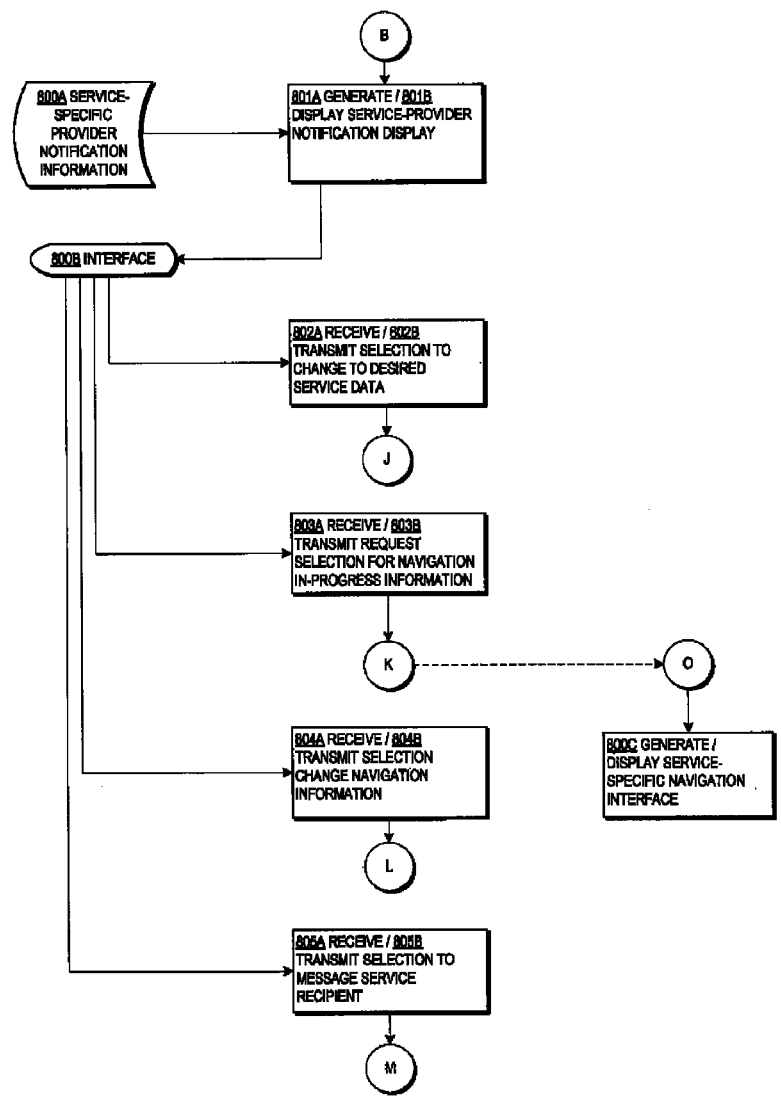
FIG. 8 includes a flowchart illustrating method steps according to various embodiments described herein.

FIG. 8 depicts embodiments of computer implemented methods including the steps of generating and displaying (801) a service-provider notification interface (800B). The generating and displaying (801) steps can be performed, for example, by a service provider device (330) executing an application module, such as the service provider client module (772) configured to perform the steps. The generating and displaying (801) steps can be performed responsive to the service-specific provider notification information (800A), such as that service-specific provider notification information (700D) transmitted to the mobile device as illustrated in FIG. 7. The service-provider notification interface (800B) can be displayed to a human user associated with a service-provider, for example, using the service provider device (330). The service-provider notification interface can include, for example, those features and functionality described herein with reference to FIG. 2 and FIG. 2G. In addition, various application modules, such as the service-provider client module (772), can be configured to receive such user-selections and to transmit user-selections to any other application module, for example, to the building director module (329) responsive to user interaction with the service-provider notification interface (800B), such as inputting or selecting user-selections.

In an example of an embodiment, the service-provider notification interface (800B) can be configured to receive (802A), from the service-provider user, a selection to change the desired service data (not pictured) and to transmit (802B) such a selection (not pictured) to one or more application modules, such as the building director module (329). In another example of an embodiment, the service-provider notification interface (800B) can be configured to receive (803A), from the service-provider user, a selection (not shown) to request navigation in-progress information and to transmit (803B) such a selection (not pictured) to one or more application modules, such as the building director module (329). In another example of an embodiment, the service-provider notification interface (800B) can be configured to receive (804A), from the service-provider user, a selection (not shown) to change the service-specific navigation information and to transmit (804B) such a selection (not pictured) to one or more application modules, such as the building director module (329). In another example of an embodiment, the service-provider notification interface (800B) can be configured to receive (805A), from the service-provider user, a selection (not shown) to message the mobile-device user to transmit (805B) such a selection (not pictured) to one or more application modules, such as the building director module (329).

Figure 9:
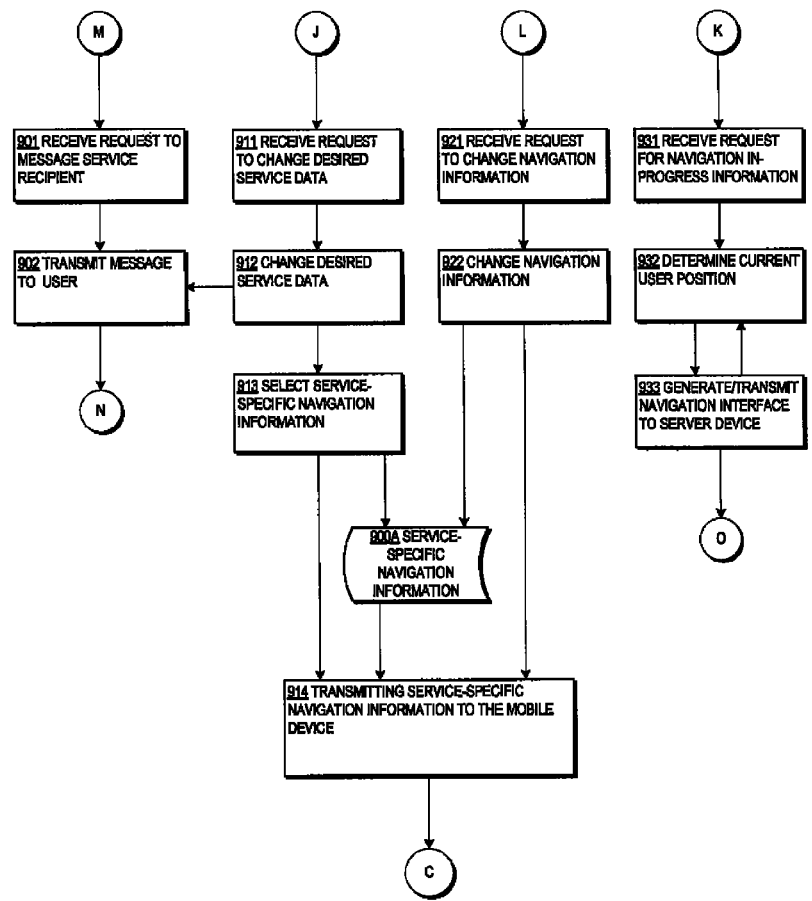
FIG. 9 includes a flowchart illustrating method steps according to various embodiments described herein.

FIG. 9 depicts embodiments of computer implemented methods including the step of receiving (901) a request to message the mobile-device user, receiving (911) a request to change the desired service data, receiving (921) a request to change the service-specific navigation information, and receiving (931) a request for navigation in-progress information. The receiving (901, 911, 921, 931) steps can be performed, for example, by a building server device (320) executing an application module, such as the building director module (329), being configured to perform the steps. The receiving (901) step and the request to message the mobile user can correspond, for example, to the transmitting (805B) step, which can be performed, for example, by the service provider device (330). The receiving (911) step and the request to change the desired-service data can correspond, for example, to the transmitting (802B) step, which can be performed, for example, by the service provider device (330). The receiving (921) step and the request to change the service-specific navigation information can correspond, for example, to the transmitting (804B) step, which can be performed, for example, by the service provider device (330). The receiving (931) step and the request to receive navigation in-progress information can correspond, for example, to the transmitting (803B) step, which can be performed, for example, by the service provider device (330).

In embodiments of the invention including the step of receiving (911) a request to change the desired service data, the computer implemented methods can further include the step of changing (912) the desired service data, to be performed responsive to the receiving (911) step. Changing the desired service data can include, for example, updating an appointment time. For example, an initial appointment time may correspond to a range of time (e.g., 10:00-12:00); and the appointment time may be updated to a more specific time (e.g., 10:45), for example, by the service provider once the service provider is aware that the service recipient is on-site.

Embodiments may further include the step of selecting (913) service-specific navigation information (900A), to be performed responsive to the changing (912) step. Such embodiments may further include the step of transmitting (914) service-specific navigation information (900A) to a mobile device, to be performed responsive to the selecting (913) step. The changing (912), selecting (913) and transmitting (914) steps can be performed, for example, by a building server device (320) executing an application module, such as the building director module (329), being configured to perform the steps. Each of the steps (912, 913, 914) can be performed as is described further herein with respect to FIG. 7 for the initial desired service selection.

Embodiments of the invention including the step of receiving (910) a request to message a mobile-device user or the step of receiving (911) a request to change the desired service data can further include the step of transmitting (902) a message to the mobile device, to be performed responsive to the receiving (901) step or the changing (911) step. The transmitting (902) step can be performed, for example, by a building server device (320) executing an application module, such as the building director module (329), being configured to perform the step. The transmitting step can be performed, for example, as is described herein with respect to any of the appointment selection interface and the inventory selection interface. The message to the user can be, for example, a change in any of the information set forth on either of the above mentioned interfaces. The message to the user can also be, for example, provided in an additional field included in either of the above mentioned interfaces (not shown). The message to the user can also be, for example, a SMS message or an email, which can be displayed using messaging software executed by the mobile device (102).

Embodiments of the invention including the step of receiving (921) a request to change the service-specific navigation information can further include the step of changing (922) service-specific navigation information, to be performed responsive to the receiving (921) step. Computer implemented methods can further include the step of transmitting (914) service-specific navigation information (900A) to a mobile device, to be performed responsive to the changing (922) step. The changing (922) and transmitting (914) steps can be performed, for example, by a building server device (320) executing an application module, such as the building director module (329), being configured to perform the steps. Each of the steps (921, 922, 914) can be performed as is described further herein with respect to FIG. 7 for the initial desired service selection.

Embodiments of the invention including the step of receiving (931) a request for navigation in-progress information can further include the step of determining (932) a current device-user position, to be performed responsive to the receiving (931) step. Computer implemented methods can further include the step of transmitting (933) a navigation interface to a service-provider device, to be performed responsive to the determining (932) step. The determining (932) step and the transmitting (933) steps can be performed, for example, by a building server device (320) executing an application module, such as the building director module (329), being configured to perform the step. Each of the steps (931, 932, 933) can be performed as is described further herein with respect to FIG. 7 and FIG. 10 for the initial desired service selection. The navigation interface transmitted to the service-provider device can be the service-specific navigation interface described with respect to FIG. 2B, FIG. 2C, FIG. 2D, FIG. 2E, FIG. 2F, but it should be noted that the position indicator represents the position of the mobile-device user (102) not the position of the service-provider user (104).

Figure 10:
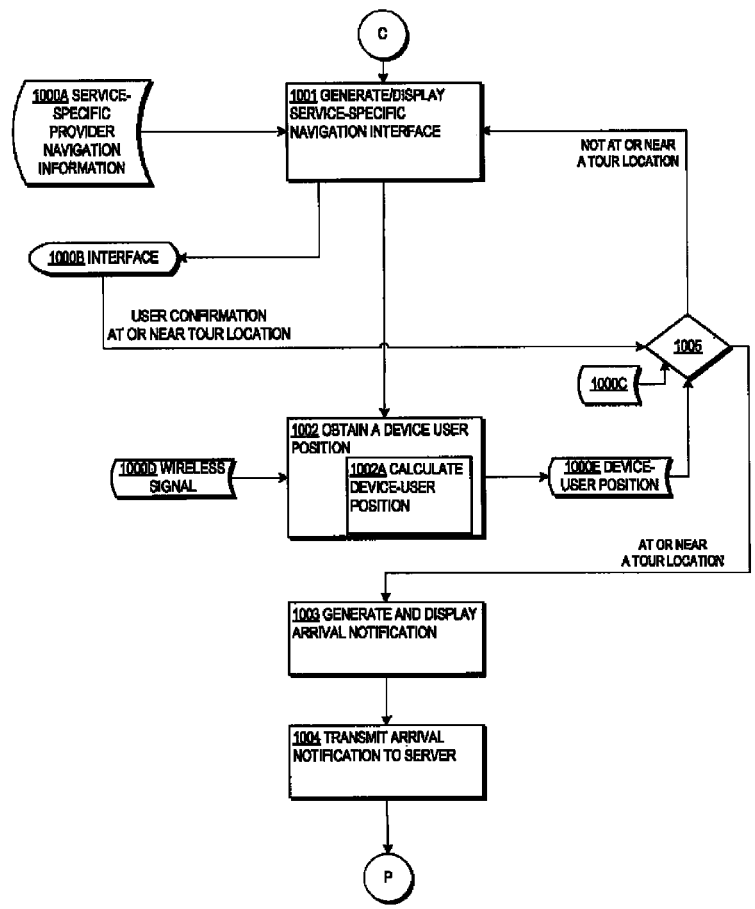
FIG. 10 includes a flowchart illustrating method steps according to various embodiments described herein.

FIG. 10 depicts embodiments of computer implemented methods including the steps of generating and displaying (1001) a service-specific navigation interface (1000B). The generating and displaying (1001) steps can be performed, for example, by a mobile device (310) executing an application module, such as the building guide module (319), that is configured to perform such steps. In certain embodiments, the generating and displaying (1001) steps can be performed, for example, by a service provider device (330) executing an application module, such as the service provider module (339), that is configured to perform such steps. The generating and displaying (1001) steps can be performed responsive to the service-specific navigation information (1000A), such as that service-specific navigation information (700F) transmitted to the mobile device as illustrated in FIG. 7. The service-specific navigation interface (1000B) can be displayed to a human device-user, for example, using the mobile device (310). The service-specific navigation interface (1000A) can include, for example, those features and functionality described herein with reference to FIG. 2 and FIG. 2B-2F.

In certain examples of embodiments, the service-specific navigation interface (1000A) can allow the device user to navigate his way from the device-user position to the service-provider in-building location using the service-specific navigation interface (1000B) to graphically guide the device user along a route (222) using a map (221) included in the navigation interface (220) so that the device user can arrive at the service-provider in-building location (224B) and thereafter receive or partake in the desired service.

FIG. 10 further depicts embodiments of computer implemented methods including the steps of repeatedly obtaining (1002) a device-user position (1000E). The obtaining (1002) step can be performed, for example, by an on-site mobile device (310) executing one or more application modules, including the building guide module (319), which can be configured to perform the step. The device-user position (1000E) can be obtained (1002) responsive to one or more wireless signals (1000D) having position information, such as one or more GPS signals, telecommunication RF signals, WAN RF signals, RFID signals, optical signals, or acoustic signals. Position information can be communicated by the wireless signal (e.g., the signal has encoded information relating to the identity or the position of the base station and the base station's location). Obtaining (1002) the device-user position (1000E) can also include calculating (1002A) the device-user position (1000E) from one or more properties of the wireless signals (1000D), as received (e.g., time difference of arrival, time-of-flight, angle of arrival, etc.). For example, the device-user position can be obtained using known positioning software, such as the GPS module (351), the telecommunications positioning module (352), the wireless positioning module (353), or the hybrid positioning module (354).

The obtaining (1002) step can be repeated, for example, as the device user physically relocates throughout the building (i.e., resulting in a changing device-user position (1000E)), and the service-specific navigation interface (1000B) can be updated (e.g., regenerated and redisplayed (1001)) responsive to the changed device-user position (1000E). The updated service-specific navigation interface (1000B) can provide, for example, an updated the map or an updated route responsive to the changed device-user position (1000E), for example, if it is determined (1005) that the changed device-user position (1000E) is not at or near the service-provider location (106) responsive to a nearness parameter (1000C). The nearness factor (1000C) can be provided within the service-specific navigation information, or alternatively, the nearness factor may be constant or variable, for example, based on the type of service-provider location or the type of the user-desired service. In certain embodiments, however, the nearness parameter (1000C) may be a preset constant so as to provide suitable functionality across a balanced range of circumstances. Even further yet, in some embodiments, a device user himself may make the determination that he is at or near a service-provider location and may make a selection at the service-specific navigation interface, for example, to input this selection into an designated field (not shown) of the navigation interface (220).

FIG. 10 further depicts embodiments of computer implemented methods including the step of generating and displaying (1003) an arrival notification responsive to the determination (1005) that the device-user position (1000E) is at or near the service provider location (106) as described above. The arrival notification can be generated and displayed as described with respect to FIG. 2F, thereby alerting the mobile-device user that he has arrived at the service-provider location and that the navigation has been successfully completed. FIG. 10 further depicts embodiments of computer implemented methods including the step of transmitting (1004) an arrival notification to the building server device. The notification can include information indicative of the arrival, for example, such as an arrival time or an arrival location (e.g., if there are more than one service-provider locations, such as may be the case if there are multiple entrances). FIG. 7 further depicts embodiments of computer implemented methods including the steps of flagging (707) the arrival in the desired service data, for example, so that the service-provider can be made aware of the arrival (e.g., either for an instant notification of for records-keeping purposes). Flagging the arrival (707) can include, for example, updating the desired service data with any of the information relating to the arrival notification, for example, such as the arrival time or the arrival location.

FIG. 3B is a block diagram of computing devices (310B, 320B, 330B) that may be used to implement various embodiments described in this document, as either a client, as a server, or plurality of servers. Computing devices (320B, 330B) are intended to represent various forms of digital computers, such as laptops, desktops, workstations, personal digital assistants, servers, blade servers, mainframes, and other appropriate computers. Computing device (310B) is intended to represent various forms of mobile computing devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device (320B, 330B) includes a processor (321, 331), input/output unit (322, 332), memory (323, 333), and storage device (324, 334). Each of the components (321, 322, 323, 324)) are interconnected using various busses, and may be mounted on a common motherboard or in other manners as appropriate. Each of the components (331, 332, 333, 334)) are also interconnected using various busses, and may be mounted on a common motherboard or in other manners as appropriate. The processor (321, 331) can process instructions for execution within the computing device (320B, 330B), including instructions stored in the memory (323, 333) or on the storage device (324, 334) to display graphical information for a graphical user interface ("GUI") on an external output device, including an input/output device, such as display (not shown) coupled to the input/output device (322, 332). In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory (323, 333) stores information within the computing device (320B, 330B). In one implementation, the memory (323, 333) is a computer-readable medium. In one implementation, the memory (323, 333) is a volatile memory unit or units. In another implementation, the memory (323, 333) is a non-volatile memory unit or units. The storage device (324, 334) is capable of providing mass storage for the computing device (320B, 330B). In one implementation, the storage device (324, 334) is a computer-readable medium. In various different implementations, the storage device (324, 334) may be a floppy disk device, a hard disk device, an optical disk device, or, a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory (323, 333), the storage device (324, 334), memory on processor (321, 331), or a propagated signal.

The I/O (322, 332) can include, for example, a high-speed controller, a low-speed controller, or both a high-speed controller and a low-speed controller. The high-speed controller manages bandwidth-intensive operations for the computing device (320B, 330B), and the low speed controller manages lower bandwidth-intensive operations. Such allocation of duties is exemplary only. In one implementation, the I/O (322, 332) is coupled to memory (323, 333), display (not shown) (e.g., through a graphics processor or accelerator), and to one or more expansion ports (not shown), such as a high-speed expansion port or a low-speed expansion port, each of which may accept various expansion cards (not shown). The I/O (322, 332) can include various communication ports (e.g., Universal Serial Bus ("USB"), Bluetooth, Ethernet, wireless Ethernet), may be coupled to one or more input devices or output devices, (either of which can also be an input/output device), such as a keyboard, a pointing device, a scanner, or a networking device such as a switch or router, e.g., through a network adapter.

The computing device (320B, 330B) may be implemented in a number of different forms, as shown in the figure. For example, it may be implemented as a standard server (320B, 330B), or multiple times in a group of such servers. It may also be implemented as part of a rack server system (not shown). In addition, it may be implemented in a personal computer such as a laptop computer (not shown). Alternatively, components from computing device (320B, 330B) may be combined with other components in a mobile device, and each of such devices may contain one or more computing device, and an entire system may be made up of multiple computing devices communicating with each other.

In an example of an embodiment, one or more computing device (320B) is configured as an application server to execute the building director module (329) and one or more computing device (330B) is configured as a client device, such as the service-provider device (330B). Computing device (310B) can be implemented in a number of different forms, as can be shown with reference to FIG. 2. For example, it may be implemented as a cellular telephone such as a smartphone (200) or a personal digital assistant, or other similar mobile device. With reference to FIG. 3B, it can be shown that computing device (310B) includes a processor (311), input/output unit ("I/O") (312) in communication with the processor (311), memory (313) in communication with the processor (311), a display (315A) in communication with the processor (311), and a user-input device (315B) in communication with the processor (311). The computing device (310B) may also be provided with a storage device (314), such as a microdrive or other device, to provide additional storage. Each of the components (311, 312, 313, 314, 315a, 315B), can be interconnected and in communication with one another using various buses, and several of the components may be mounted on a common motherboard or hi other manners as appropriate and known to those having skill in the art. The processor (311) can process instructions for execution within the computing device (310B), including instructions stored in the memory (313). The processor (311) can also include separate analog and digital processors. The processor (311) can provide, for example, for coordination of the other components of the computing device (310B), such as control of user interfaces, applications run by computing device (310B), and wireless communication by computing device (310B).

Processor (311) can communicate with a user through user-input device (315B) and display device (315A). The display (315A) can be, for example, an LCD (liquid crystal display), e.g., a TFT-LCD (thin film transistor liquid crystal display), or an OLED (organic light emitting diode), or other appropriate display technology known to those having skill in the art (including, for example, mechanical displays such as a split-flap display). The display (315A) can comprise appropriate circuitry for driving the display (315A) to present graphical and other visual information to a user. The user-input device (315A) can receive commands from a user and convert them for submission to the processor (311) and can be any type of device configured or adapted for such purpose, including, for example a keyboard, keypad, touch-screen sensor, microphone, camera, pointer, trackball, trackpad, and other devices known to those having skill in the art. In addition, an external interface (316) may be provided in communication with processor (311), so as to enable near-area communication of device (310B) with other devices. External interface (316A) can provide, for example, for wired communication (e.g., via a docking procedure) or for wireless communication (e.g., via Bluetooth or other such technologies).

The memory (313) stores information within the computing device (310B). In one implementation, the memory (313) is a computer-readable medium. In one implementation, the memory (313) is a volatile memory unit or units. In another implementation, the memory (313) is a non-volatile memory unit or units. Memory (313) may provide storage space for device (310B), or may also store applications or other information for device (310B). Expansion memory (316C) may also be provided and connected to device (310B) through expansion interface (316B), which may include, for example, a SIMM card interface. Such expansion memory (316C) may provide extra storage space for device (310B), or may also store applications or other information for device (310B). Specifically, expansion memory (316C) may include instructions to carry out or supplement the processes described above, and may include secure information also. Thus, for example, expansion memory (316C) may be provided as a security module for device (310B), and may be programmed with instructions that permit secure use of device (310B). In addition, secure applications may be provided via the SIMM cards, along with additional information, such as placing identifying information on the SIMM card in a non-hackable manner. The memory (313) or expansion memory (316C) may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory (313), expansion memory (316C), memory on processor (311), or a propagated signal.

The input/output unit (312) can include, for example, a wireless communication interface (316D), and computing device (310B) may communicate wirelessly through the wireless communication interface (316D), which may include digital signal processing circuitry where necessary. Wireless communication interface (316D) may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver (316E). In addition, short-range communication may occur, such as using a Bluetooth, Wi-Fi, or other such transceiver (316F). In addition, Global Positioning System ("GPS") receiver (316A) may provide additional wireless data to the computing device (310B), which may be used as appropriate by applications running on the computing device (310B).

Computing device (310B) may also communicate audibly using one or more audio device (316G), such as a speaker or a microphone, which may receive spoken information from a user and convert it to usable digital information using an appropriate audio codec or may likewise generate audible sound for a user using a suitable audio codec, such as through a speaker, e.g., in a handset of device (310B). Such sound may include sound from voice telephone calls, may include recorded sound (e.g., voice messages, audio/music files, etc.) and may also include sound generated by applications operating on device (310B).

According to various examples of embodiments of the present invention, any of the above-mentioned data repositories or databases can be any data structure or any sort of organized collection of data in digital form, unless otherwise expressly described as limited to a particular structure. Databases may include the data itself, the structure or organization of the data, as well as the computer programs that provides data organization services to other computer programs or computers, such as according to a client-server model, and any computer dedicated to running such computer programs (i.e., a database server). Databases may include, for example, a database management system ("DBMS") consisting of software that operates the database, supports query languages, provides storage, access, security, backup and other facilities. Databases may implement database model, including, for example, the relational model, the hierarchical model, the network model, and the object-oriented model. References to data structures or operations herein that imply one type of model exists shall not be interpreted to exclude any other type of structure or model for achieving the described purpose, unless expressly limited herein. The DBMS may further include interface drivers, which are code libraries that provide methods to prepare statements, execute statements, fetch results, etc. DBMS may further include a relational engine to implement relational objects such as Table, Index, and Referential integrity constraints. DBMS may further include a storage engine to store and retrieve data from secondary storage, as well as managing transaction commit and rollback, backup and recovery, etc. Data stored in the databases may be updated as needed, for example, by a user with administrative access to the database or to an area of the database, such as to add new data to tables or libraries in the database as they become supported. It will be appreciated by those having skill in the art that data described herein as being stored in the databases may also be stored or maintained in non-transitory memory and accessed among two or more subroutines, functions, modules, objects, program products, or processes for example, according to objects or variables of such subroutines, functions, modules, objects, program products or processes. Any of the fields of the records, tables, libraries, and so on of the database may be flat files or multi-dimensional structures resembling an array or matrix and may include values or references to other fields, records, tables, or libraries. Any of the foregoing fields may contain actual values or a link, a join, a reference, or a pointer to other local or remote sources for such values. Further; any database may be, for example, a single database, multiple databases, or a virtual database, including data from multiple sources, for example, servers on the World Wide Web.

Figure 11A:
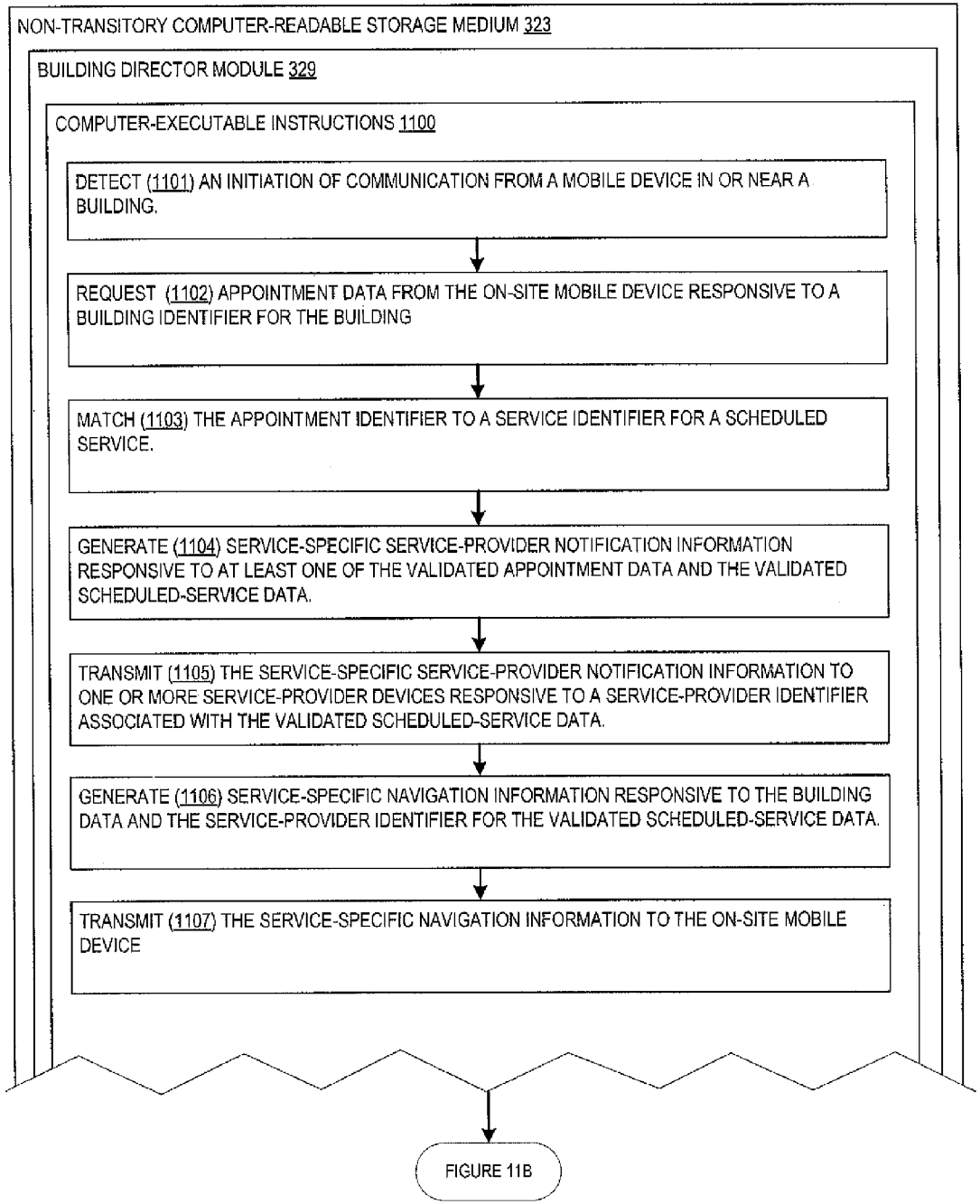
FIG. 11 includes a schematic diagram illustrating computer program instructions according to various embodiments described herein.
Figure 11B:
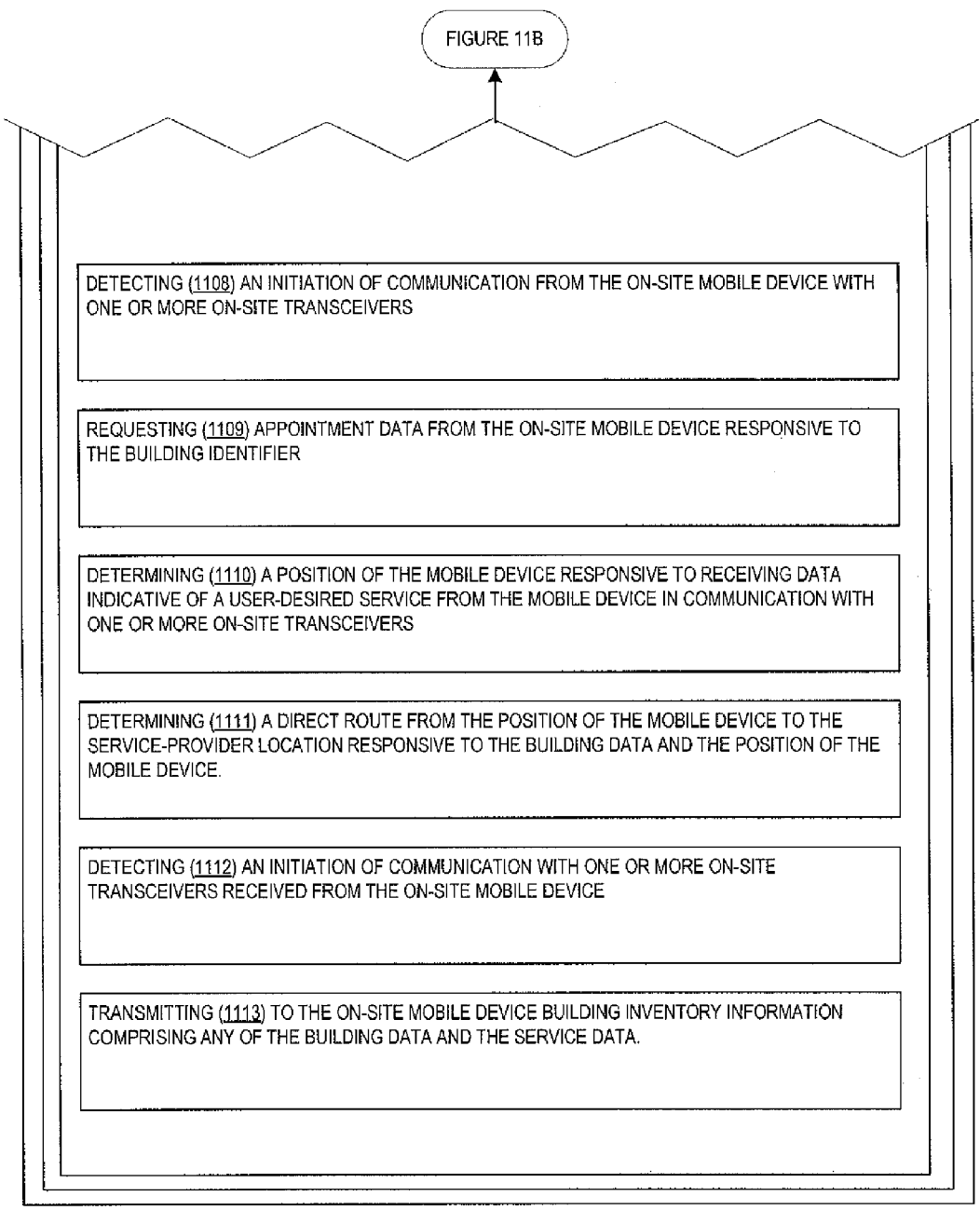

FIG. 11 depicts embodiments including executable computer code, such as the building director module (329) comprising a set of instructions (1100) that, when executed by a computing device, such as the building server device (320), causes the device to perform one or more operations as are described further herein. In some embodiments, an instruction of the set of executable instructions (1100) can include an instruction to detect (1101) an initiation of communication from a mobile device in or near a building. The mobile device can define an on-site mobile device. In some embodiments, an instruction of the set of executable instructions (1100) can include an instruction to request (1102) appointment data from the on-site mobile device responsive to a building identifier for the building. The on-site mobile device may respond by transmitting appointment data including an appointment identifier. In some embodiments, an instruction of the set of executable instructions (1100) can include an instruction to match (1103) the appointment identifier to a service identifier for a scheduled service. The service data associated with the matching service identifier can be validated scheduled-service data. In some embodiments, an instruction of the set of executable instructions (1100) can include an instruction to generate (1104) service-specific service-provider notification information responsive to at least one of the validated appointment data and the validated scheduled-service data. In some embodiments, an instruction of the set of executable instructions (1100) can include an instruction to transmit (1105) the service-specific service-provider notification information to one or more service-provider devices responsive to a service-provider identifier associated with the validated scheduled-service data. In some embodiments, an instruction of the set of executable instructions (1100) can include an instruction to generate (1106) service-specific navigation information responsive to the building data and the service-provider identifier for the validated scheduled-service data. In some embodiments, an instruction of the set of executable instructions (1100) can include an instruction to transmit (1107) the service-specific navigation information to the on-site mobile device so that the on-site mobile device, when transported in the building, displays a navigation interface responsive to the service-specific navigation information.

Also, in some embodiments, examples of instructions of the set of executable instructions (1100) can include detecting (1108) an initiation of communication from the on-site mobile device with one or more on-site transceivers and requesting (1109) appointment data from the on-site mobile device responsive to the building identifier, the on-site mobile device being adapted to respond by transmitting appointment data including an appointment identifier.

Also, in some embodiments, examples of instructions of the set of executable instructions (1100) can include determining (1110) a position of the mobile device responsive to receiving data indicative of a user-desired service from the mobile device in communication with one or more on-site transceivers, and determining (1111) a direct route from the position of the mobile device to the service-provider location responsive to the building data and the position of the mobile device.

Also, in some embodiments, examples of instructions of the set of executable instructions (1100) can include detecting (1112) an initiation of communication with one or more on-site transceivers received from the on-site mobile device; and transmitting (1113) to the on-site mobile device building inventory information comprising any of the building data and the service data.

Figure 12:
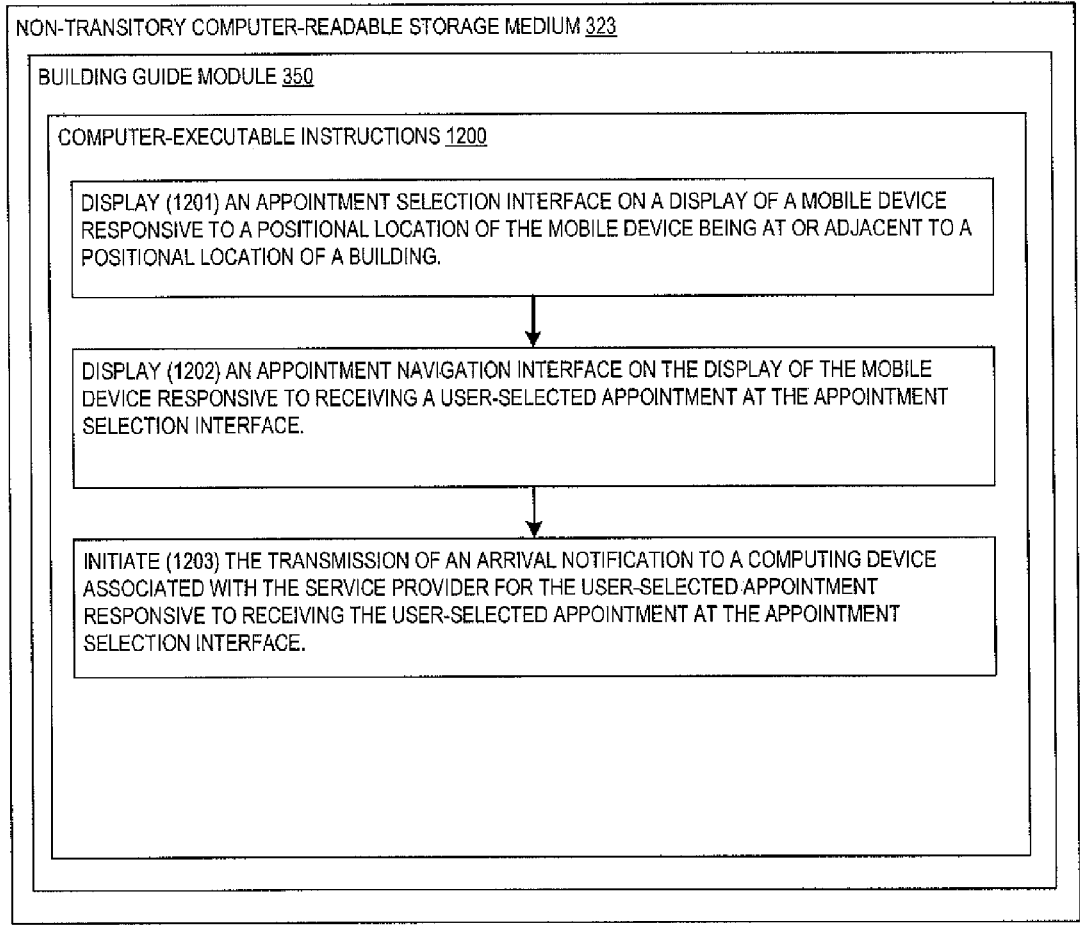
FIG. 12 includes a schematic diagram illustrating computer program instructions according to various embodiments described herein.

FIG. 12 depicts embodiments including executable computer code, such as the building guide module (319) comprising a set of instructions (1200) that, when executed by a computing device, such as the mobile device (310), causes the mobile device to perform one or more operations as are described further herein. In some embodiments, an instruction of the set of executable instructions (1200) can include an instruction to display (1201) an appointment selection interface on a display of a mobile device responsive to a positional location of the mobile device being at or adjacent to a positional location of a building. The appointment selection interface can include one or more predefined appointments for scheduled services to be provided at the building. In some embodiments, an instruction of the set of executable instructions (1200) can include an instruction to display (1202) an appointment navigation interface on the display of the mobile device responsive to receiving a user-selected appointment at the appointment selection interface. The appointment navigation interface can include graphical floor plan data (e.g., from the building data) for the building indicative of a route between the positional location of the mobile device and the positional location of a service provider for the user-selected appointment.

Also, in some embodiments, an instruction of the set of executable instructions (1200) can include an instruction to initiate (1203) the transmission of an arrival notification to a computing device associated with the service provider for the user-selected appointment responsive to receiving the user-selected appointment at the appointment selection interface. In some embodiments, initiating the transmission of an arrival notification to a computing device associated with the service provider for the user-selected appointment includes transmitting an arrival notification to a building server device configured to receive the arrival notification and to transmit the arrival notification to the computing device associated with the service provider.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device such as a CRT (cathode ray tube) or LCD (liquid crystal display) monitor to display information to the user and a keyboard and a pointing device (e.g., touch-screen sensor, a mouse, or a trackball) by which the user can provide input to the computer. Other categories of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

A number of implementations have been described. Nevertheless, it will be understood that various modifications may be made without departing from the spirit and scope of this disclosure. Accordingly, other implementations are within the scope of the claims.

Various embodiments may further include receiving, sending or storing instructions and/or data implemented in accordance with the foregoing description upon a computer-accessible medium. Generally speaking, a computer-accessible/readable storage medium may include non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Words related to numbering used herein—such as "primary," "secondary," "first," "second," "third" or other ordinal numbers—are merely descriptive and do not define or connote any specific order or degree of importance except as expressly qualified herein. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

That claimed is:

1. A system to interface between a mobile device being transported in a building by a mobile-device user and one or more service-provider devices relating to a user-desired service, the system comprising:
   a processor;
   a database in communication with the processor, the database being operable to store building data for the building including a building identifier, the database further being operable to store service data for a plurality of services for the building, the service data including a service identifier and a service-provider identifier for each service of the plurality of services;

an input/output unit in communication with the processor and adapted to be in communication with a plurality of service-provider devices and one or more transceivers at the building to transmit communications to and receive communications from a plurality of mobile devices adapted to be in communication with the one or more transceivers;

a non-transitory computer-readable storage medium having stored thereon executable computer code comprising a set of instructions that, when executed by the processor, causes the system to perform the following operations:

detecting, through passive network listening, the presence of a mobile device at the building based on wireless signals sent from the mobile device to one or more wireless access points, at least partially in response to detecting the presence of the mobile device, receiving data indicative of a user-desired service from a mobile device in communication with one or more of the transceivers, the mobile device defining an on-site mobile device, wherein the data indicative of a user-desired service includes appointment data describing a previously scheduled service, matching the data indicative of the user-desired service to service data responsive to the service identifier, the matching service data defining desired-service data, selecting, based on the service provider identifier associated with the desired-service data, a service-provider device from among the plurality of service-provider devices at the building;

transmitting, to the selected service-provider device, service-specific notification information, the service-specific notification information including any of the following: the data indicative of the user-desired service and the desired-service data, selecting service-specific navigation information from the building data responsive to the service-provider identifier associated with the desired-service data, the service-specific navigation information corresponding to a service-provider location in the building;

dynamically generating a service-navigation map responsive to a route between the in-building locations of the mobile-device user and the service-provider; and transmitting the service-specific navigation map to the on-site mobile device so that the on-site mobile device, when transported in the building, displays a navigation interface responsive to the service-specific navigation information.

2. The system as defined in claim 1, wherein:

detecting the presence of the mobile device comprises detecting an initiation of communication from the on-site mobile device with one or more of the transceivers, and receiving data indicative of the user-desired service comprises requesting appointment data from the on-site mobile device responsive to the building identifier, the on-site mobile device being adapted to respond by transmitting appointment data including an appointment identifier; and matching the data indicative of the user-desired service comprises matching the appointment identifier to the service identifier for the previously scheduled service.

3. The system as defined in claim 1, wherein the service-specific navigation information includes building floor-plan data.

4. The system as defined in claim 3, wherein:

the set of instructions, when executed by the processor, further causes the system to perform the operations of:

determining a position of the mobile device responsive to receiving data indicative of a user-desired service from the mobile device in communication with one or more of the transceivers, and determining a route from the position of the mobile device to the service-provider location responsive to the building data and the position of the mobile device; and the selecting operation is further responsive to the route from the position of the mobile device to the service-provider location.

5. The system as defined in claim 4, wherein the service-specific navigation information excludes portions of the building floor-plan data that are not related to one or more of:

the route between the position of the mobile-device user and the service-provider location, and one or more of the following: a building entrance, a building exit, a restroom, an elevator, an escalator, and a staircase.

6. The system as defined in claim 1, wherein the set of instructions, when executed by the processor, further causes the system to perform the following operations:

detecting an initiation of communication with one or more of the transceivers received from the on-site mobile device; and transmitting to the on-site mobile device building inventory information comprising any of the building data and the service data.

7. The system as defined in claim 6, wherein the data indicative of a user-desired service is received from the on-site mobile device responsive to a user interface at the on-site mobile device operably displaying the building inventory information.

8. Non-transitory computer-readable storage medium having stored thereon executable computer code comprising a set of instructions that, when executed by a computer, causes the computer to perform the following operations:

detecting, through passive network listening, an initiation of communication from a mobile device in or near a building to one or more wireless access points, the mobile device defining an on-site mobile device;

requesting appointment data from the on-site mobile device responsive to a building identifier for the building, the on-site mobile device being adapted to respond by transmitting appointment data including an appointment identifier, wherein the appointment data describes a previously scheduled service;

matching the appointment identifier to a service identifier for the previously scheduled service, the service data associated with the matching service identifier defining validated scheduled-service data;

generating service-specific service-provider notification information responsive to at least one of the validated appointment data and the validated scheduled-service data;

selecting, based on the service identifier matched to the appointment identifier, a service-provider device from among a plurality of service-provider devices at the building;

transmitting, to the selected service-provider device, the service-specific service-provider notification information;

generating service-specific navigation information responsive to building data and the service-provider identifier for the validated scheduled-service data;

dynamically generating a service-navigation map responsive to a route between the in-building locations of the mobile-device user and the service-provider; and transmitting the service-specific navigation map to the on-site mobile device so that the on-site mobile device, when transported in the building, displays a navigation interface responsive to the service-specific navigation information.

9. The non-transitory computer-readable storage medium as defined in claim 8, wherein the service-specific navigation information includes building floor-plan data.

10. The non-transitory computer-readable storage medium as defined in claim 9, wherein:

the set of instructions, when executed by the computer, further causes the computer to perform the operations of:

determining a position of the mobile device responsive to receiving appointment data from the mobile device in communication with one or more on-site transceivers, and determining a route from the position of the mobile device to the service-provider location responsive to the building data and the position of the mobile device; and the selecting operation is further responsive to the route from the position of the mobile device to the service-provider location.

11. The non-transitory computer-readable storage medium as defined in claim 10, wherein the service-specific navigation information excludes portions of the building floor-plan data that are not related to one or more of:

the route between the position of the mobile-device user and the service-provider location; and one or more of the following: a building entrance, a building exit, a restroom, an elevator, an escalator, and a staircase.

12. The non-transitory computer-readable storage medium as defined in claim 8, wherein the set of instructions, when executed by the computer, further causes the computer to perform the following operations:

detecting an initiation of communication with one or more on-site transceivers received from the on-site mobile device; and transmitting to the on-site mobile device building inventory information comprising any of the building data and the service data.

13. The non-transitory computer-readable storage medium as defined in claim 12, wherein the appointment data is received from the on-site mobile device responsive to a user interface at the on-site mobile device operably displaying the building inventory information.

14. A computer-implemented method to provide information to a mobile device that is relevant to a location of the mobile device, the method comprising:

detecting, by one or more computing devices, through passive network listening at one or more wireless access points, a signal indicative of the presence of a mobile device in or near a building;

at least partially in response to detecting the signal indicative of the presence of a mobile device, transmitting, by the one or more computing devices, to the mobile device a request for data indicative of schedule events associated with a user of the mobile device and also associated with the building;

receiving, by the one or more computing devices, the requested data indicative of schedule events, wherein the schedule events includes appointment data describing a previously scheduled service;

based on the identified schedule events, identifying, by the one or more computing devices, a destination of the user at which the previously scheduled service is provided;

selecting another device associated with the identified destination;

transmitting, by the one or more computing devices, to the selected other device, a notification; and based on the identified destination, dynamically generating, by the one or more computing devices, a service-navigation map responsive to a route between the locations of the mobile device and the identified destination; and transmitting, by the one or more computing devices, the service-navigation map to the mobile device so that the mobile device, when transported in the building, displays the service-navigation map.

15. The computer-implemented method as defined in claim 14, wherein the information that indicates at least part of a route to the identified destination includes building floor-plan data.

16. The computer-implemented method as defined in claim 15, further comprising:

determining a position of the mobile device; and determining a route from the position of the mobile device to the identified destination.

17. The computer-implemented method as defined in claim 16, wherein the information that indicates at least part of a route to the identified destination excludes building information that is not related to one or more of:

the route between the position of the mobile-device user and the identified destination, and one or more of the following: a building entrance, a building exit, a restroom, an elevator, an escalator, and a staircase.

18. The computer-implemented method as defined in claim 14, further comprising:

transmitting to the mobile device inventory information comprising data indicative of services to be provided at a building.

19. The computer-implemented method as defined in claim 18, wherein the identified schedule events are received responsive to a user interface at the device operably displaying the inventory information.

20. The computer-implemented method as defined in claim 14, further comprising:

displaying an appointment selection interface on a display of the mobile device responsive to a positional location of the mobile device being at or adjacent to a positional location of the building, the appointment selection interface including one or more predefined appointments for schedule events; and displaying an appointment navigation interface on the display of the mobile device responsive to receiving a user-selected appointment at the appointment selection interface, the appointment navigation interface including graphical floor plan data for the building indicative of at least part of the route to the identified destination.

* * * * *

UNITED STATES PATENT AND TRADEMARK OFFICE
CERTIFICATE OF CORRECTION

| | |
|---|---|
| PATENT NO. | : 9,068,846 B1 |
| APPLICATION NO. | : 13/342616 |
| DATED | : June 30, 2015 |
| INVENTOR(S) | : Boerger |

Page 1 of 1

It is certified that error appears in the above-identified patent and that said Letters Patent is hereby corrected as shown below:

Claims

Column 44, Line 13, claim 14 after "notification;" please delete "and"

Signed and Sealed this
Second Day of August, 2016

Michelle K. Lee
*Director of the United States Patent and Trademark Office*